(12) United States Patent
Srinivasan et al.

(10) Patent No.: US 7,769,711 B2
(45) Date of Patent: Aug. 3, 2010

(54) MIGRATION OF CONTROL IN A DISTRIBUTED SEGMENTED FILE SYSTEM

(75) Inventors: Sudhir Srinivasan, Acton, MA (US); Steven A. Orszag, Princeton, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 11/755,649

(22) Filed: May 30, 2007

(65) Prior Publication Data

US 2007/0226331 A1    Sep. 27, 2007

Related U.S. Application Data

(60) Division of application No. 10/832,660, filed on Apr. 26, 2004, now abandoned, which is a continuation of application No. 10/425,393, filed on Apr. 29, 2003, now abandoned, which is a continuation-in-part of application No. 09/950,555, filed on Sep. 11, 2001, now Pat. No. 6,782,389.

(60) Provisional application No. 60/232,102, filed on Sep. 12, 2000, provisional application No. 60/395,839, filed on Jul. 15, 2002, provisional application No. 60/447,720, filed on Feb. 19, 2003, provisional application No. 60/447,722, filed on Feb. 19, 2003, provisional application No. 60/447,723, filed on Feb. 19, 2003.

(51) Int. Cl.
*G06F 17/30* (2006.01)

(52) U.S. Cl. .................................. 707/609; 707/827

(58) Field of Classification Search ................. 707/609
See application file for complete search history.

(56) References Cited

U.S. PATENT DOCUMENTS

| | | | |
|---|---|---|---|
| 4,901,231 A | 2/1990 | Bishop et al. | |
| 5,455,953 A | 10/1995 | Russell | |
| 5,513,314 A | 4/1996 | Kandasamy et al. | |
| 5,828,876 A | 10/1998 | Fish et al. | |
| 5,873,103 A | 2/1999 | Trede et al. | |
| 5,909,540 A | 6/1999 | Carter et al. | |
| 5,948,062 A | 9/1999 | Tzelnic et al. | |
| 5,960,446 A | 9/1999 | Schmuck et al. | |
| 5,987,506 A | 11/1999 | Carter et al. | |
| 5,991,804 A * | 11/1999 | Bolosky et al. | 709/221 |
| 6,023,706 A | 2/2000 | Schmuck et al. | |
| 6,163,801 A | 12/2000 | O'Donnell et al. | |
| 6,173,293 B1 | 1/2001 | Thekkath et al. | |
| 6,185,601 B1 | 2/2001 | Wolff | |
| 6,192,408 B1 | 2/2001 | Vahalia et al. | |
| 6,324,581 B1 | 11/2001 | Xu et al. | |
| 6,345,244 B1 | 2/2002 | Clark | |
| 6,356,863 B1 | 3/2002 | Sayle | |
| 6,389,420 B1 | 5/2002 | Vahalia et al. | |
| 6,442,608 B1 | 8/2002 | Knight et al. | |
| 6,453,354 B1 | 9/2002 | Jiang et al. | |

(Continued)

*Primary Examiner*—James Trujillo
*Assistant Examiner*—William Spieler

(57) ABSTRACT

A method of managing segments in a distributed-file system implemented by a plurality of file servers includes determining a segment of the distributed-file system controlled by a first file server for which control is to be migrated, selecting a second file server, that is different from the first file server, to take control of the segment, and moving control of the segment from the first file server to the second file server.

16 Claims, 17 Drawing Sheets

U.S. PATENT DOCUMENTS

| | | |
|---|---|---|
| 6,516,320 B1 | 2/2003 | Odom et al. |
| 6,564,215 B1 * | 5/2003 | Hsiao et al. .................... 707/8 |
| 6,571,259 B1 | 5/2003 | Zheng et al. |
| 6,654,912 B1 | 11/2003 | Viswanathan et al. |
| 6,772,161 B2 | 8/2004 | Mahalingam et al. |
| 6,782,389 B1 | 8/2004 | Chrin et al. |
| 6,823,336 B1 | 11/2004 | Srinivasan et al. |
| 6,938,039 B1 | 8/2005 | Bober et al. |
| 6,973,455 B1 | 12/2005 | Vahalia et al. |
| 2002/0059309 A1 | 5/2002 | Loy et al. |
| 2002/0095479 A1 | 7/2002 | Schmidt |
| 2002/0120763 A1 | 8/2002 | Miloushev et al. |
| 2002/0138501 A1 | 9/2002 | Dake |
| 2002/0138502 A1 | 9/2002 | Gupta |
| 2002/0143734 A1 | 10/2002 | Loy et al. |
| 2002/0161855 A1 | 10/2002 | Manczak et al. |
| 2003/0004947 A1 | 1/2003 | Coverston |
| 2003/0028587 A1 | 2/2003 | Driscoll et al. |
| 2003/0033308 A1 | 2/2003 | Patel et al. |
| 2003/0079222 A1 | 4/2003 | Boykin et al. |
| 2003/0110237 A1 | 6/2003 | Kitamura et al. |
| 2003/0115434 A1 | 6/2003 | Mahalingam et al. |
| 2003/0115438 A1 | 6/2003 | Mahalingam et al. |
| 2004/0133570 A1 | 7/2004 | Soltis |

* cited by examiner

MIGRATION OF CONTROL IN A DISTRIBUTED SEGMENTED FILE SYSTEM

CROSS-REFERENCES TO RELATED APPLICATIONS

The present application is a divisional of U.S. patent application Ser. No. 10/832,660, filed on Apr. 26, 2004, which is a continuation of U.S. patent application Ser. No. 10/425,393, filed Apr. 29, 2003, which is a continuation-in-part of U.S. patent application Ser. No. 09/950,555, filed Sep. 11, 2001, now U.S. Pat. No. 6,782,389, which claims the benefit of U.S. Provisional Application No. 60/232,102, filed Sep. 12, 2000, with U.S. patent application Ser. No. 10/425,393 also claiming the benefit of U.S. Provisional Application No. 60/395,839, filed Jul. 15, 2002, U.S. Provisional Application No. 60/447,720, filed Feb. 19, 2003, U.S. Provisional Application No. 60/447,722, filed Feb. 19, 2003, and U.S. Provisional Application No. 60/447,723, filed Feb. 19, 2003. The full disclosures of these applications are incorporated herein by reference.

BACKGROUND OF THE INVENTION

1. Field of the Invention

The present invention concerns computer storage and file systems. More specifically, the present invention concerns techniques for managing and using a distributed storage system.

2. Related Art

Data generated by, and for use by, computers is stored in file systems. The design of file systems has evolved in the last two decades, basically from a server-centric model (which can be thought of as a local file system), to a storage-centric model (which can be thought of as a networked file system).

Stand alone personal computers exemplify a server-centric model—storage has resided on the personal computer itself, initially using hard disk storage, and more recently, optical storage. As local area networks ("LANs") became popular, networked computers could store and share data on a so-called file server on the LAN. Storage associated with a given file server is commonly referred to as server attached storage ("SAS"). Storage could be increased by adding disk space to a file server. Unfortunately, however, SASs are only expandable internally—there is no transparent data sharing between file servers. Further, with SASs, throughput is limited by the speed of the fixed number of busses internal to the file server. Accordingly, SASs also exemplify a server centric-model.

As networks became more common, and as network speed and reliability increased, network attached storage ("NAS") has become popular. NASs are easy to install and each NAS, individually, is relatively easy to maintain. In a NAS, a file system on the server is accessible from a client via a network file system protocol like NFS or CIFS.

Network file systems like NFS and CIFS are layered protocols that allow a client to request a particular file from a pre-designated server. The client's operating system translates a file access request to the NFS or DFS format and forwards it to the server. The server processes the request and in turn translates it to a local file system call that accesses the information on magnetic disks or other storage media. The disadvantage of this technology is that a file system cannot expand beyond the limits of single NAS machine. Consequently, administering and maintaining more than a few NAS units, and consequently more than a few file systems, becomes difficult. Thus, in this regard, NASs can be thought of as a server-centric file system model.

Storage area networks (SANs) (and clustered file systems) exemplify a storage-centric file system model. SANs provide a simple technology for managing a cluster or group of disk-storage units, effectively pooling such units. SANs use a front-end system, which can be a NAS or a traditional server. SANs are (i) easy to expand, (ii) permit centralized management and administration of the pool of disk storage units, and (iii) allow the pool of disk storage units to be shared among a set of front-end server systems. Moreover, SANs enable various data protection/availability functions such as multi-unit mirroring with failover for example. Unfortunately, however, SANs are expensive. Although SANs permit space to be shared among front-end server systems, they do not permit multiple SANs environments to use the same file system. Thus, although SANs pool storage, they basically behave as a server-centric file system. That is, a SAN behaves like a fancy (e.g., with advanced data protection and availability functions) disk drive on a system. Also, various incompatible versions of SANs have emerged.

The article, T. E. Anderson et al., "Serverless Network File Systems," *Proc. 15th ACM Symposium on Operating System Principles*, pp. 109-126 (1995) (hereafter referred to as "the Berkeley paper") discusses a data-centric distributed file system. In the system, manager maps, which map a file to a manager for controlling the file, are globally managed and maintained. Maintaining and storing a map having every file could, however, limit scalability of the system as the number of files become large.

BRIEF SUMMARY OF THE INVENTION

The present invention may provide methods, apparatus and data structures for providing a file system which meets various needs. A distributed file system in which files are distributed across more than one file server and in which each file server has physical storage media may be provided. The present invention can determine a particular file server to which a file system call pertains by (a) accepting a file system call including a file identifier, (b) determining a contiguous unit of the physical storage media of the file servers of the distributed file system based on the file identifier, (c) determining the file server having the physical storage media that contains the determined contiguous unit, and (d) forwarding a request, based on the file system call accepted, to the file server determined to have the physical storage media that contains the determined contiguous unit.

The file identifier may be an Inode number and the contiguous unit may be a segment. The file server having the physical storage media that contains the determined contiguous unit may be determined by a table, administered globally across the file system, that maps the contiguous unit to (the (e.g., IP) address of) the file server.

In general, in an aspect, the invention provides a method of managing segments in a distributed-file system implemented by a plurality of file servers, the method including determining a segment of the distributed-file system controlled by a first file server for which control is to be migrated, selecting a second file server, that is different from the first file server, to take control of the segment, and moving control of the segment from the first file server to the second file server.

Implementations of the invention may include one or more of the following features. The moving comprises changing a stored first association of segments and file servers that associates the segment to the first file server to a stored second association that associates of the segment to the second file server. The changing occurs in each of the plurality of file servers that implement the distributed-file system. The changing occurs substantially simultaneously in at least each of the file servers whose set of controlled segments is affected by the change. The changing occurs substantially at a first time in each of the file servers whose set of controlled segments is affected by the change and occurs at a second time, different than the first time, in a file server whose set of controlled segments is unaffected by the change. The changing comprises modifying a mapping of segments and file servers. The changing comprises one of editing the mapping of segments and file servers and replacing the mapping of segments and file servers.

Implementations of the invention may also include one or more of the following features. The method further includes proliferating to each of the file servers at least one indication of the moving of control of the segment. The method further includes proliferating a version number of revised association of segments and file servers. The method further includes verifying a version number, of an association of segments and file servers, associated with an authorization request before providing authorization. The method further includes denying authorization if the version number associated with the authorization request indicates an older version of the association of segments and file servers than a version of the association of segments and file servers stored in association with a device receiving the authorization request, and obtaining the association of the segments and file servers associated with the version number indicates a newer version of the association of segments and file servers than the version of the association of segments and file servers stored in association with the device receiving the authorization request. The method further includes proliferating an indication of a time to effect the moving of control.

Implementations of the invention may also include one or more of the following features. Moving control of the segment occurs while a memory location that stores the first file server remains unchanged. The method further includes quiescing the segment before moving control of the segment. The method further includes de-quiescing the segment after moving control of the segment.

In general, in another aspect, the invention provides a device for managing segments in a distributed-file system implemented by a plurality of file servers, the device including a communication interface configured to communicate with the file servers, and a processor coupled to the communication interface and configured to: determine a segment of the distributed-file system controlled by a first file server for which control is to be migrated; select a second file server, that is different from the first file server, to take control of the segment; and send indicia to the file servers to effect moving of control of the segment from the first file server to the second file server.

Implementations of the invention may include one or more of the following features. The indicia are configured to cause the file servers to change a stored first association of segments and file servers that associates the segment to the first file server to a stored second association that associates of the segment to the second file server. The indicia are configured to cause the change to occur substantially simultaneously in at least each of the file servers whose set of controlled segments is affected by the change. The indicia are configured to cause the change to occurs substantially at a first time in each of the file servers whose set of controlled segments is affected by the change and occurs at a second time, different than the first time, in a file server whose set of controlled segments is unaffected by the change. The indicia are configured to cause the file servers to one of edit the first association to become the second association and replace the first association with the second association.

Implementations of the invention may also include one or more of the following features. The processor is configured to send further indicia to the file servers to distinguish the second association from the first association. The further indicia include a version number of second association of segments and file servers. The processor is configured to send to the file servers an indication of a time to effect the moving of control. The processor is configured to instruct the first file server to quiesce the segment before control of the segment is moved. The processor is configured to instruct the second file server to de-quiesce the segment after control of the segment is moved.

In general, in another aspect, the invention provides a computer program product residing on a computer-readable medium for managing segments in a distributed-file system implemented by a plurality of file servers, the computer program product including computer-readable and computer-executable instructions for causing a computer to: determine a segment of the distributed-file system controlled by a first file server for which control is to be migrated; select a second file server, that is different from the first file server, to take control of the segment; and send indicia to the file servers to effect moving of control of the segment from the first file server to the second file server.

Implementations of the invention may include one or more of the following features. The indicia are configured to cause the file servers to change a stored first association of segments and file servers that associates the segment to the first file server to a stored second association that associates of the segment to the second file server. The indicia are configured to cause the change to occur substantially simultaneously in at least each of the file servers whose set of controlled segments is affected by the change. The indicia are configured to cause the change to occurs substantially at a first time in each of the file servers whose set of controlled segments is affected by the change and occurs at a second time, different than the first time, in a file server whose set of controlled segments is unaffected by the change. The indicia are configured to cause the file servers to one of edit the first association to become the second association and replace the first association with the second association.

Implementations of the invention may also include one or more of the following features. The computer program product further includes instructions for causing the computer to send further indicia to the file servers to distinguish the second association from the first association. The further indicia include a version number of second association of segments and file servers. The computer program product further includes instructions for causing the computer to send to the file servers an indication of a time to effect the moving of control. The computer program product further includes instructions for causing the computer to instruct the first file server to quiesce the segment before control of the segment is moved. The computer program product further includes instructions for causing the computer to instruct the second file server to de-quiesce the segment after control of the segment is moved.

In general, in another aspect, the invention provides a first file server for use in an association of devices that implements a distributed-file system, the association of devices including a plurality of file servers that each are configured to control separate portions of the distributed-file system, the first file server including a communication interface configured to communicate with a second file server of the plurality of servers, and a processor coupled to the communication interface. The processor is configured to, determine that an incoming file system communication is associated with a first portion of the distributed-file system associated with a second file server of the plurality of servers, send a first authorization request to the second file server to request authorization to directly access the first portion of the distributed-file system, analyze a first authorization response from the second file server to determine at least one storage location associated with the first portion of the distributed-file system, determine that an incoming second authorization request received from a third file server from the plurality of file servers by the interface is associated with a second portion of the distributed-file system associated with the first file server, obtain data indicative of the second portion of the distributed-file system, and send a second authorization response that includes the data.

In general, in another aspect, the invention provides a method of associating data with a file server from among a plurality of file servers in a distributed-file system, the method including receiving a communication at a first file server among the plurality of file servers in the distributed-file system, the communication pertaining to data to be stored in the distributed-file system, the data being associated with a file-system portion of the distributed-file system controlled by a second file server, and storing the data under control of a third file server such that the data are stored in the distributed-file system non-hierarchically relative to the file-system portion.

Embodiments of the invention may provide one or more of the following advantages. In a distributed-file system, storage capacity can be added easily, data sharing may be permitted, and effective performance may be provided with very large storage capacity and client loads.

In embodiments of the invention, a file server may be combined with other computational elements, as in what is called a cluster computing environment and in what is called a grid computing environment by those practiced in the art. In these latter computing environments, the invention allows additional computational elements to be added while providing data sharing and effective data I/O performance with very large storage capacity and numbers of computational elements in a cluster and in a grid.

DETAILED DESCRIPTION OF PREFERRED EMBODIMENTS

The present invention involves novel methods, apparatus and data structures for providing advanced data storage. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not limited to the embodiments shown and the invention includes the following disclosed methods, apparatus, articles of manufacture, and data structures and equivalents thereof.

In the following, environments in which the present invention may be employed are introduced in §4.1. Then, functions that may be performed by the present invention are introduced in §4.2. Then, operations, data structures, methods and apparatus that may be used to effect those functions are described in §4.3. Thereafter, examples of how exemplary parts of the present invention may operate is described in §4.4. Finally, some conclusions about the present invention are set forth in §4.5.

Exemplary Environments in which Invention May Operate

The following exemplary environments are presented to illustrate examples of utility of the present invention and to illustrate examples of contexts in which the present invention may operate. However, the present invention can be used in other environments and its use is not intended to be limited to the exemplary environment.

Figure 1:
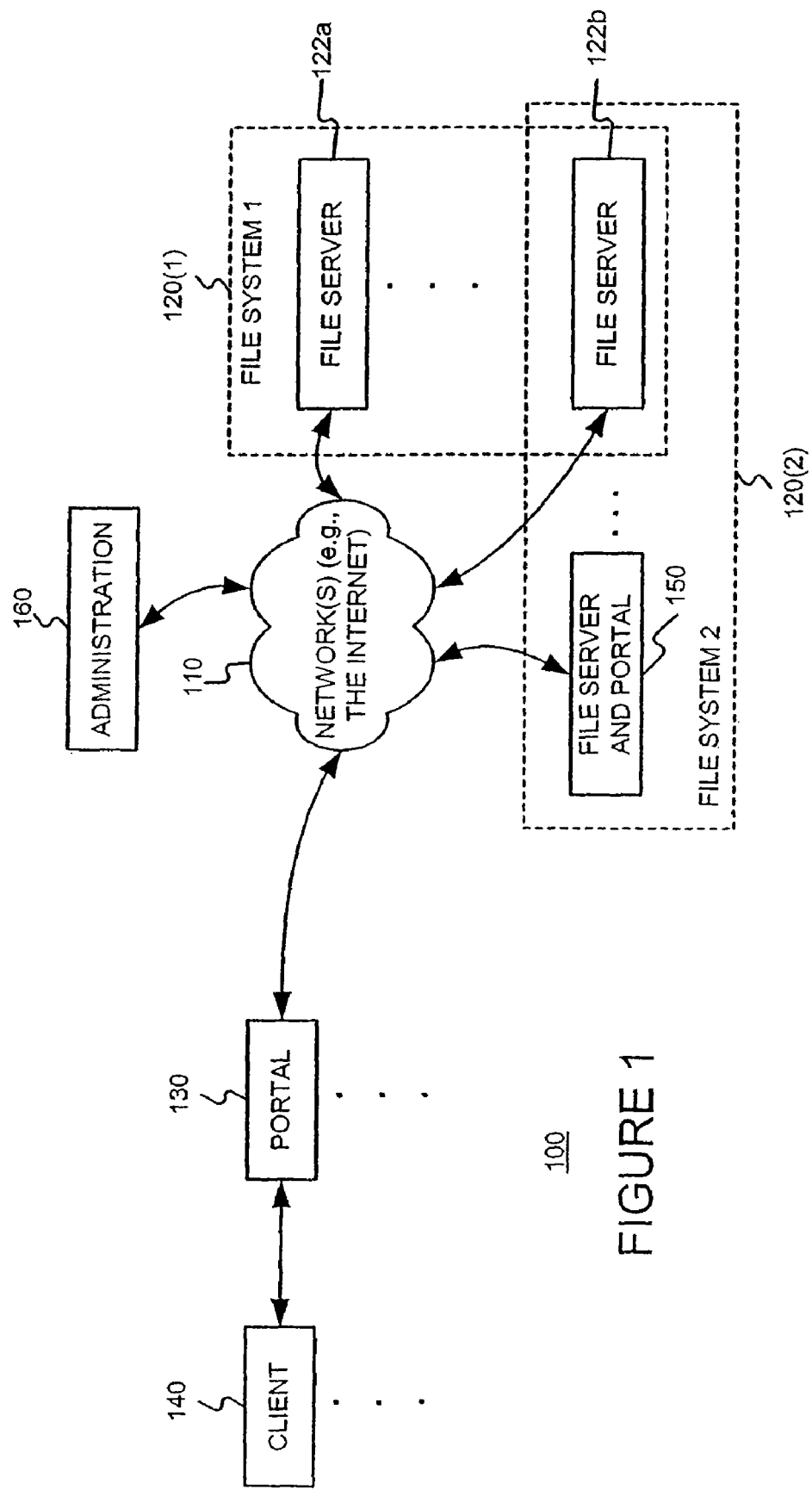
FIG. 1 is a block diagram of an exemplary environment in which various aspects of the present invention may take place.

FIG. 1 is a block diagram of an environment 100 in which the present invention may be used. Various components are coupled with (i.e., can communicate with) a network(s) 110, such as an Internet protocol ("IP") based network. A file system 120(1), 120(2) may include one or more file servers 122. One or more portal units 130 permit one or more clients 140 to use the file system(s). The clients 140 may or may not be provided with special front end software or application.

From the perspective of a client 140, the file system 120(1), 120(2) is a virtual single storage device residing on the portal 130. Combined file server and portal units 150 are possible. Administration 160 of the file servers 122 and portals 130, or combination 150, may be centralized. Administrative information may be collected from the units 122, 130, 150 and distributed to such units 122, 130, 150 in a point-to-point or hierarchical manner. As shown, the environment 100 can support multiple file systems 120(1), 120(2) if desired. As illustrated, a single file server 122b may belong to/support more than one file system.

Exemplary Functions that May be Performed by the Present Invention

The present invention may (i) permit storage capacity to be added easily (as is the case with NASs), (ii) permit file systems to be expanded beyond a given unit (as is the case with SANs), (iii) provide a file system that is easy to administer and manage, (iv) permit data sharing, and (v) provide all this functionality in a way that remains efficient at very large capacities and client loads. The present invention may do so by (e.g., automatically) disseminating (e.g., state) information from a newly added unit to central administration and management operations, and by (e.g., automatically) disseminating (e.g., configuration and control) information from such operations back down to the newly added units, as well as existing units. In this way, a file system can span both local storage devices (like disk drives) and networked computational devices transparently to clients. Such state and configuration and control information can include information regarding globally managed segments that are the building blocks of the file system, and a fixed mapping of globally unique file identifiers (e.g., Inode numbers) and/or ranges thereof, to such segments.

Having introduced functions that may be performed by the present invention, exemplary operations, data structures, methods and apparatus for effecting these functions are described in §4.3 below.

Exemplary Operations, Data Structures, Methods and Apparatus for Effecting Functions that May be Performed by the Present Invention In the following, exemplary operations that may be performed by the present invention, and exemplary data structures that may be used by the present invention, are introduced in §4.3.1 with reference to FIGS. 2-4. Then, exemplary methods for effecting such operations are described in §4.3.2 with reference to FIGS. 5-8. Finally, exemplary apparatus that may be used to effect the exemplary processes and store the exemplary data structures are described in §4.3.3 with reference to FIG. 9.

Exemplary Operations and Data Structures

Figure 2:
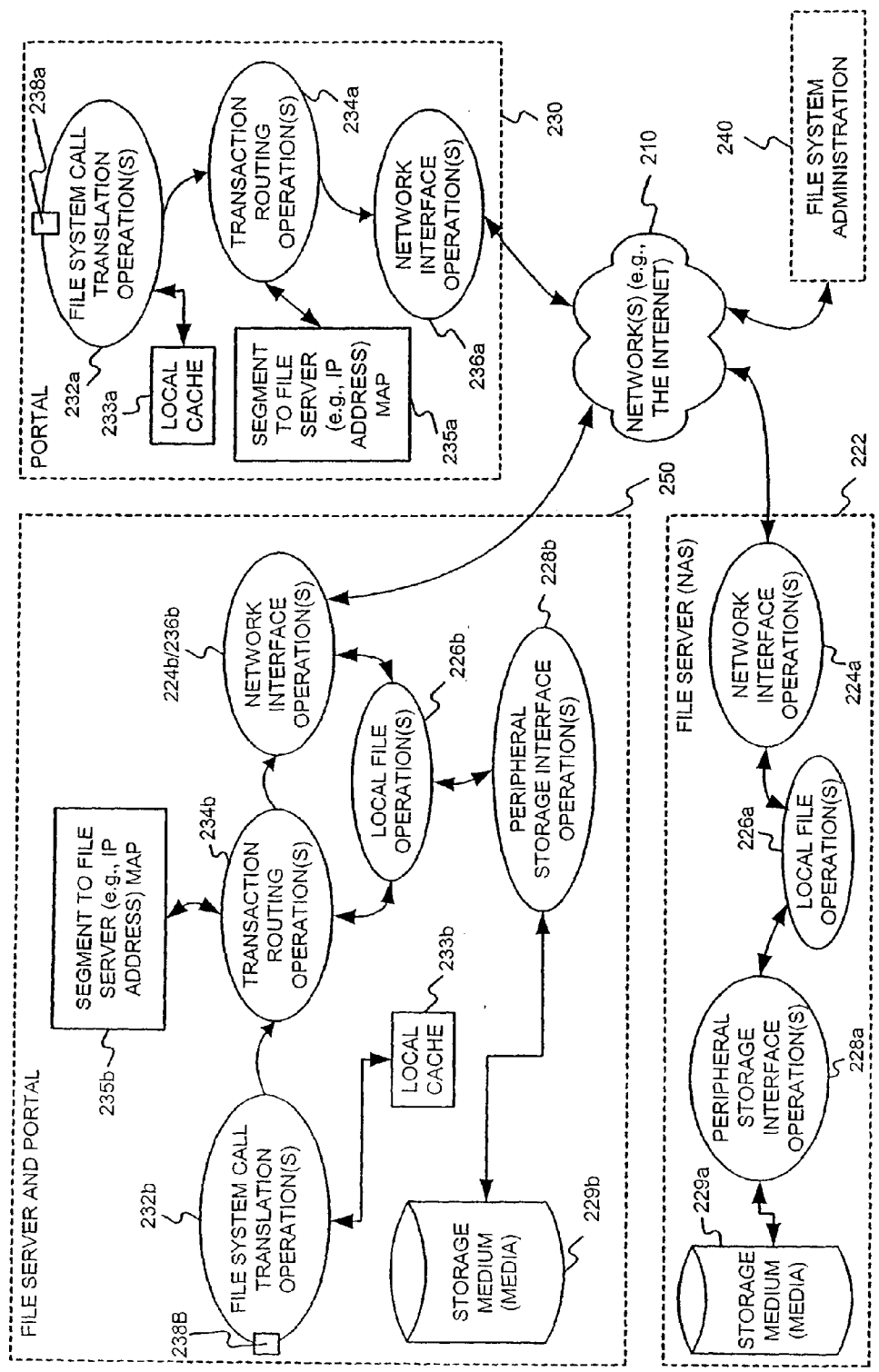
FIG. 2 is a process bubble diagram of operations that may be carried out by various exemplary apparatus used in the environment of FIG. 1.

FIG. 2 is a process bubble diagram of operations that may be carried out by various exemplary apparatus used in the environment of FIG. 1. The apparatus include a portal 230, a file server 222, and/or a combined file server and portal 250. Each of these units may be coupled with one or more networks 210 that facilitate communications among the units. One or more file system administration units 240 may be used to gather information about components of a file system, and disseminate system control information to components (e.g., supporting portal functions) of a file system. Such information gathering and dissemination may take place over the network(s) 210, or some other network.

Referring first to the file server 222, the local file operation(s) 226a represents the typical core functionality of a file system including reading and writing files, inserting and deleting directory entries, locking, etc. The details of the implementation of this file system are not important outside of the characteristics and behavior specified here. The local file operation(s) 226a translates given requests into input/output ("I/O") requests that are then submitted to a peripheral storage interface operation(s) 228a. The peripheral storage interface operation(s) 228a processes all the I/O requests to the local storage sub-system 229a. The storage sub-system 229a can be used to store data such as files. The peripheral storage interface operation(s) 228a may be used to provide data transfer capability, error recovery and status updates. The peripheral storage interface operation(s) 228a may involve any type of protocol for communication with the storage sub-system 229a, such as a network protocol for example. File operation requests access the local file operation(s) 226a, and responses to such requests are provided to the network(s) 210, via network interface operation(s) 224a.

Referring now to the portal 230, a client (user) can access the file system of the present invention via an access point 238a in a file system call translation operation(s). One way for this entry is through a system call, which will typically be operating system specific and file system related. The file system call translation operation(s) 232a can be used to convert a file system request to one or more atomic file operations, where an atomic file operation accesses or modifies only one file object. Such atomic file operations may be expressed as commands contained in a transaction object. If the system call includes a file identifier (e.g., an Inode number), the file system call translation operation(s) 232a may also be used to determine a physical part of a storage medium of the file system corresponding to the transaction (e.g., a segment number) from a (globally) unique file identifier (e.g., Inode number). The file system call translation operation(s) 232a may include a single stage or multiple stages. This file system call translation operations may also contain local cache 233a. This local cache 233a may include a local data cache, a cache of file locks and other information that may be frequently needed by a client, or by a program servicing a client. If a request cannot be satisfied using local cache 233a, the file system translation operation(s) 232a may forward the transaction object containing atomic file operation commands to the transaction routing operation(s) 234a. Similar functionality is provided in, and similar operations may be performed by, the combined portal and file server 250.

In the portal 230, or the combined portal 250, the transaction routing operation(s) 234b uses the (globally) unique file identifier (e.g., Inode number) associated with each atomic file operation command, or the physical part of a file system (e.g., the segment number) derived therefrom, to determine the location (e.g., the IP address) of a file server 222/250 that is in charge of the uniquely identified file. This file server can be local (i.e., for the unit 250 acting as both a portal and a file server, that received the request) or remote. If this file server is local, the transaction routing operation(s) 234b simply passes the file operation to the local file operation(s) 226b which, in turn, passes an appropriate command(s) to the peripheral storage interface operation(s) 228b for accessing the storage medium 229b. If, on the other hand, the file server is remote, the network(s) 210 is used to communicate this operation. The system is independent of any particular networking hardware, protocols or software. All networking requests are handed over to a network interface operation(s) 224b, 236b.

The network interface operation(s) 224/236 services networking requests regardless of the underlying hardware or protocol, and is used to forward the transaction towards the appropriate file server 222, 250 (i.e., that controls a particular file system segment associated with the request). The network interface operation(s) 224/236 may provide data transfer, error recovery and status updates on the network(s) 210.

Figure 3:
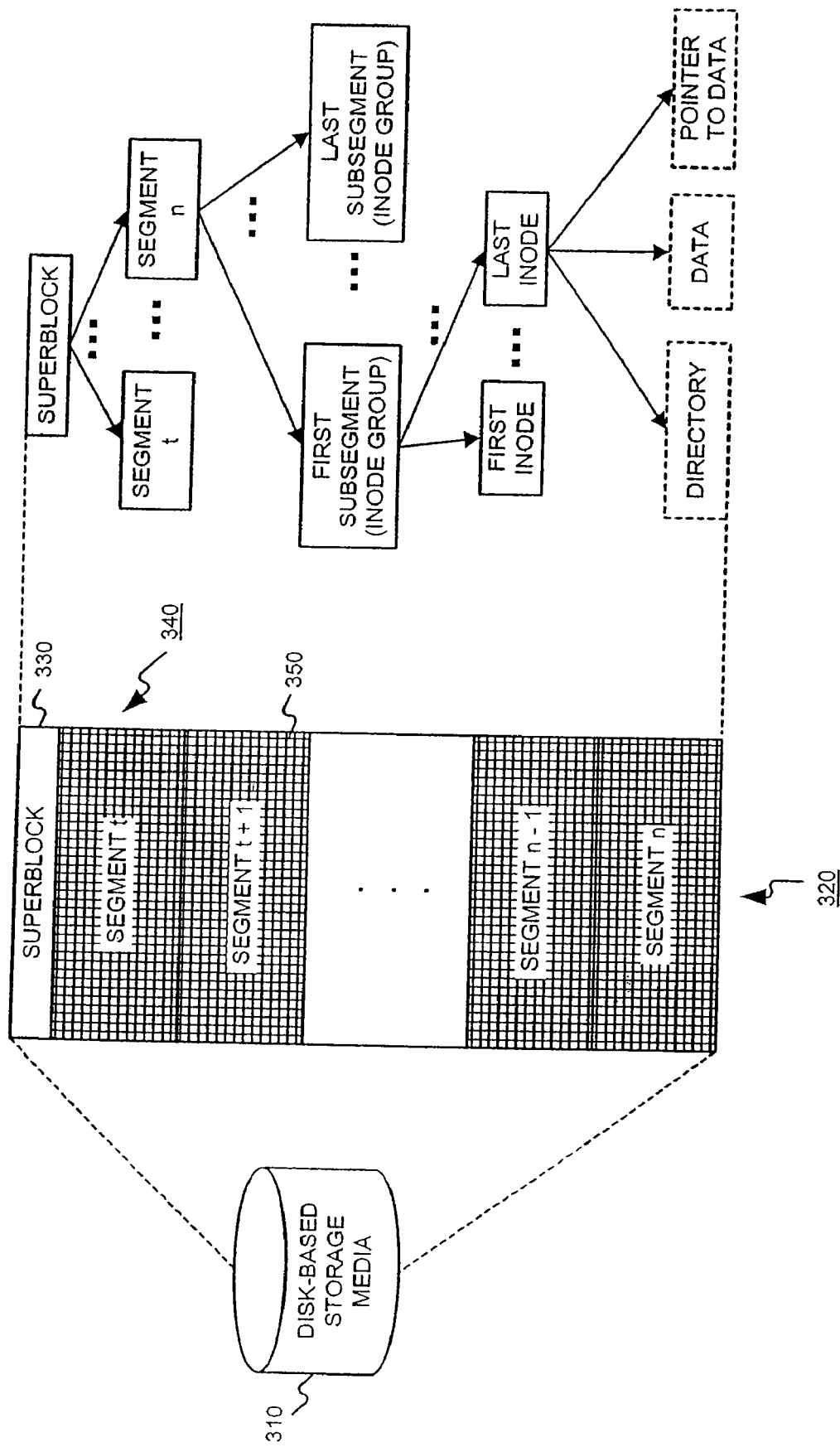
FIG. 3 is a block diagram of an exemplary data structure of a storage medium, such as a disk-based storage medium.
Figure 4:
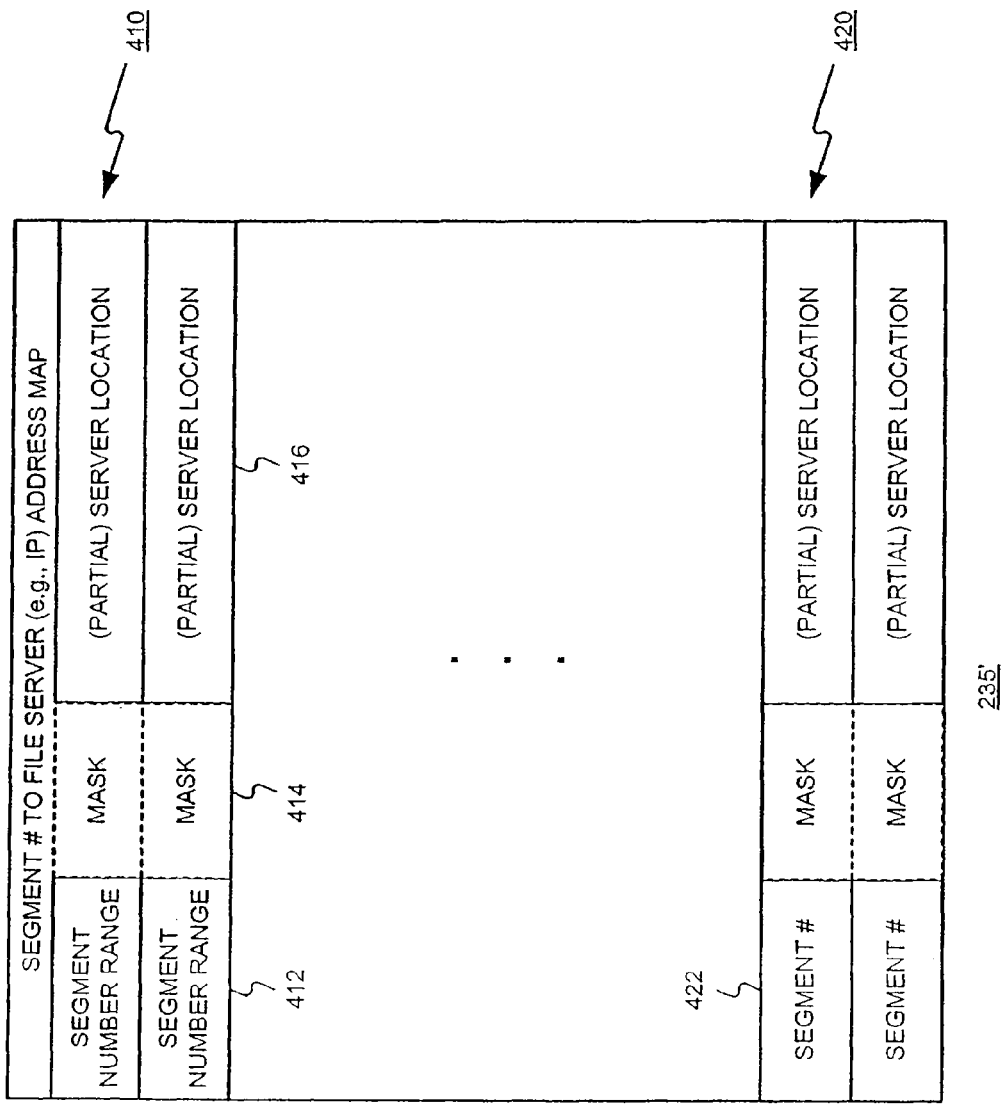
FIG. 4 is a block diagram of an exemplary table data structure that may be used to map segment numbers to an identifier (e.g., an address) of a file server storing the segment.

Referring now to FIG. 3, a virtual storage 310 is provided that stores file system data. The storage 310 is a logical volume of storage and as shown may be a disk-based storage, although this is not required. A logical volume manager (LVM) aggregates the storage.

Rather than using a disk (or some other discrete storage unit or medium) 310 as a fundamental unit of a file system, an exemplary embodiment of the present invention employs a smaller unit, referred to as a "segment" 340. A segment 340 is a contiguous range of disk (or other storage medium) memory with a predetermined maximum size (e.g., 64 gigabytes ("GB") in one exemplary embodiment). The actual target size for a segment is configurable. In one exemplary embodiment, the target size is four (4) GB. In such an embodiment, a typical single disk drive with a capacity of, for example, 50 GB, would contain between one and a dozen segments. The actual sizes of segments can vary from disk (or other storage medium) to disk (or other storage medium).

To determine what each disk (or some other storage medium) contains, a superblock 330 is added at a fixed address. This superblock 330 contains a map of all the segments 340 residing on this disk (or some other storage medium). Such a map may list the blocks 350 where the segments start. The superblock 330 may also associate the file system(s) with the segments that belong to the file system. The superblock may be duplicated for fault-tolerance either on the same disk (or some other storage medium) or a different one.

In the file system of the present invention, a file or Inode stored on a disk (or some other storage media) may be addressed by (i) a segment number, and (ii) a block number within the segment. The translation of this address to a physical disk address need only occur at (or by) the lowest level, by the peripheral storage interface operation(s) (e.g., thread) 228 of the appropriate file server 222/250. None of the basic file system functionality needs to know anything about which disk (or other storage medium) the segment resides on, or whether or not two segments are on the same physical hardware. That is, the client and file system calls from the client do not need to know anything about which disk (or other storage medium) a segment is on (or even the segment for that matter). Neither, in fact, do the local file operations 226 need to know anything about the disk (or other storage medium) that a given segment resides on.

In accordance with the present invention, within a file system, each (globally) unique file identifier ("FID") (e.g., an Inode number, a file control block (FCB) in a Windows® operating system, etc.) is associated with a single controlling segment, though each segment can have more than one associated FID (e.g., Inode number). The FIDs (e.g., Inode numbers) can be associated with their segments in a simple fixed manner. For example, in an exemplary embodiment of the present invention, any segment has a fixed number of storage portions with which Inode numbers may be associated.

For example, for a maximum segment size of 64 GB, the fixed number of Inodes per segment may be 8,388,608 (this number comes from dividing the 64 GB maximum segment size by an average file size of 8 KB). In this exemplary embodiment, the segment number can be used to determine the actual ranges of Inode numbers controlled by a segment in the file system. For example, the first segment (number 0) of a file system would have Inode numbers 0 through 8,388,607. The second segment would have Inode numbers 8,388,608 through 16,777,215, and so on. The root Inode (directory) of a file system is assigned the number 1 by convention (Inode 0 is not used) and, of course, resides on the first segment. Note that the foregoing numbers represent the maximum ranges of Inodes that a given segment may control—the actual numbers of Inodes that have been allocated will generally be much smaller.

An Inode in the present invention may have essentially the same properties as that of a traditional file system Inode. A number uniquely identifies the Inode, which in an exemplary embodiment is a 64-bit quantity. The Inode may contain key information about a file or directory such as type, length, access and modification times, length, location on disk, owner, permissions, link-count, etc. It may also contain additional information specific to the particular file system.

On disk (or other storage medium), Inodes may be maintained in Inode blocks (or groups). The Inode blocks themselves may be quite simple. In one exemplary implementation, they simply include a bitmap showing which Inodes in the block are free, a count of free Inodes, and the array of Inodes themselves, as many as fit in the block.

As noted above, each segment of the file system is responsible for a fixed set of Inode numbers. This principle is repeated within the segment—that is, segments may be of varying size, but they are always made up of some multiple of the smallest file system unit, namely the Subsegment. Within the segment, each Subsegment is again responsible for a fixed subset of the Inodes in the segment.

The data-centric nature of the file system of the present invention, and the advantages of such a data-centric file system can be appreciated from the fact that essentially every operation that can be performed on a file system is associated with some single (globally) unique FID (e.g., Inode number). In the exemplary embodiment, to determine where that file is stored, and hence where the operation needs to be performed, simply dividing the Inode number by the constant 8,388,608 yields the segment number. (If the result is not a whole number, it is truncated to the next lower whole number. For example, if the Inode number divided by the constant was 1.983, the segment number would be 1).

This convention also makes it simple to distribute the file system over multiple servers as well—all that is needed is a map of which segments of the file system reside on which host file server. More specifically, once the segment number is derived from the Inode number, the appropriate file server can be determined by mapping, such as a routing table. In the simplest case, this map is simply a table that lists the file servers (on which the local agents execute) corresponding to particular segments. In one exemplary embodiment, the file server is identified by its IP address. More generally, file servers may be organized in groups, in a hierarchy, or in some other logical topology and the lookup may require communication over the network with a group leader or a node in a hierarchy. For efficiency, such information may be cached on a leased basis with registration for notification on changes to maintain coherency. The local file operation(s) 226 and peripheral storage operation(s) 228 at the determined file server can then determine the file to which an operation pertains. Once the request has been satisfied at the determined file server, the result is sent back to the original (portal) server (which may be the same as the determined file server). The original (portal) server may then return the result to the requesting client.

In one exemplary embodiment of the present invention, each (globally) unique FID (e.g., Inode) resides in a segment referred to as the "controlling segment" for that FID (e.g., Inode). As is understood in the art, an Inode is associated with each file and encloses key information, metadata, about the file (e.g., owner, permissions, length, type, access and modification times, location on disk, link count, etc.), but not the actual data. In the exemplary embodiment of the present invention, the data associated with an Inode may actually reside on another segment (i.e., outside the controlling segment of the Inode). However, the controlling segment of a particular Inode, and the segment(s) containing the data associated with the particular Inode, will be addressable and accessible by the controlling file server. A group of segments that is addressable and accessible by a given file server are referred to as a "maximal segment group". Thus, the Inode and its associated data (e.g., the contents of the file) are contained within a maximal segment group.

At any given time, a segment is under the control of at most one local agent (i.e., residing on the local file server). That agent is responsible for carrying out file system operations for any FID controlled by that segment. The controlling segment's unique identifier ("SID") for each FID is computable from the FID by the translator using information available locally (e.g., in the superblock 330). In the foregoing exemplary embodiment, the controlling SID may be computed simply via integer division of the FID by a system constant, which implies a fixed maximum number of files controlled per segment. Other algorithms may be used.

Data from a file may be contained in a segment in the maximal segment group which is not under the control of the file server responsible for the controlling segment. In this case, adding space to or deleting space from the file in that segment may be coordinated with the file server responsible for it. No coordination is necessary for simple read accesses to the blocks of the file.

Client (user) entry and access to the entire file system may thus occur through any unit that has translation and routing operations, and that has access to a segment location map. Such units may be referred to as "portals." Multiple simultaneous access points into the system are a normal configuration of the file system. Note that a portal unit will not need a file system call translator operation(s) 232, assuming that such operations are provided on the client (end user) machines. However, such a configuration will require software installation and maintenance on a potentially large number of machines.

Exemplary Methods

Exemplary methods that may be used to effect some of the operations introduced in §4.3.2 above, are now described.

Figure 5:
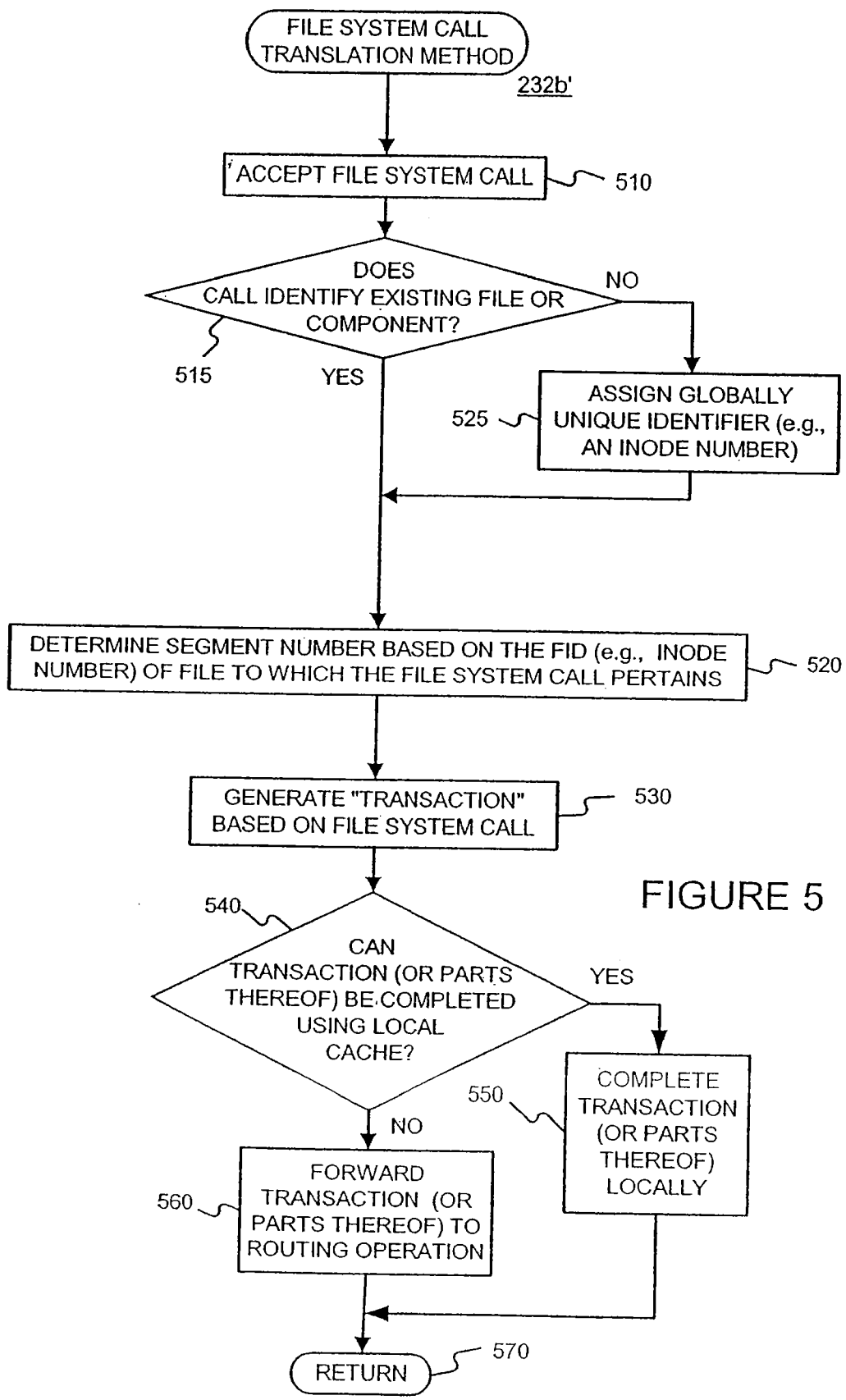
FIG. 5 is a flow diagram of an exemplary method that may be used to effect a file system call translation operation.

FIG. 5 is a flow diagram of an exemplary method 232b' that may be used to effect a file system call translation operation 232b. A file system call is accepted, as indicated by block 510. It is assumed that the file system call includes some type of globally unique file identifier ("FID"), such as an Inode number for example. Note that such a globally unique identifier will typically not be included when a file (or other component such as a directory or folder) is first provided (e.g., written) to the file system. As shown by conditional branch point 515 and block 525, if this is the case, a globally unique identifier (e.g., an Inode number) is assigned. Such assignment may be based on policies and/or global file system state information. Next, as shown in block 520, the relevant segment number is determined based on the unique FID (e.g., Inode number) of the file to which the file system call pertains. Recall that this may be done by dividing an Inode number by some fixed number (and truncating to the next lower whole number if a remainder exists) in one embodiment. Then, a file system transaction is generated based on the file system call, as indicated by block 530. That is, a file system call from a client may have a particular format or syntax. If necessary, information from this file system call is simply reformatted into the appropriate syntax used in the distributed file system. This syntax may be a transaction object containing one or more so-called atomic file operation commands.

At conditional branch point 540, it is determined whether or not the transaction (or parts thereof) can be completed using the local cache (assuming that such a local cache is provided). If so, the transaction (or parts thereof) is completed locally, as indicated by block 550, and the method 232b' is left via RETURN node 570. Otherwise, the transaction (or parts thereof) is forwarded to a routing operation as indicated by block 560, and the method 232b' is left via RETURN node 570.

Figure 6:
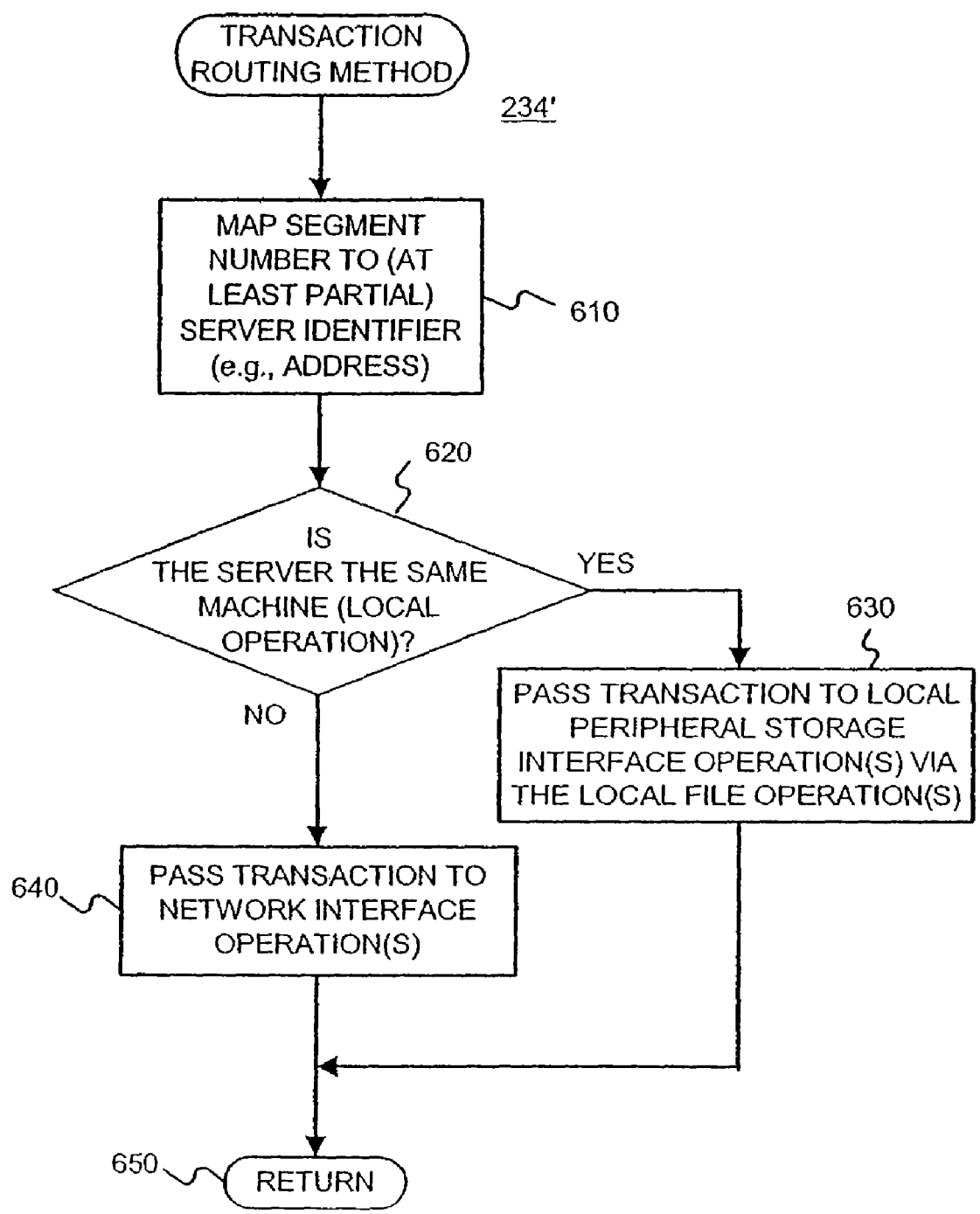
FIG. 6 is a flow diagram of an exemplary method that may be used to effect a transaction routing operation.

FIG. 6 is a flow diagram of an exemplary method 234' that may be used to effect a transaction routing operation 234. As indicated by block 610, the segment number is used to determine (e.g., mapped to) a server identifier or address (or at least to another machine that can map the segment to a server identifier or address). The server identifier or address may be an Internet protocol ("IP") address. For example, in the exemplary data structure 235' of FIG. 4 if the segment number (or a part thereof not masked out by a mask 414) matches a stored segment number 422, or falls within a range of segment numbers 412, the appropriate file server location, or partial file server location, 416 can be determined. Such a table may be manually or automatically populated (e.g., using file system administration 240) in a variety of ways, many of which will be apparent to those skilled in the art. For example, segment number-file server (address) associations can be manually tracked, and provisioned manually, by some global (i.e., file system wide) administrative authority. Each portal could then be manually configured using information from the administrative authority. On the other end of the spectrum, some automated signaling and network state distribution protocols, such as those commonly used by routers for example, may be used to collect file server information, provision segment numbers to that file server, and distribute segment number-file server associations to all portal units.

Referring back to FIG. 6, at conditional branch point 620, it is determined whether or not the portal/server is the same file server as that identified. That is, whether or not the transaction is to be performed locally is determined. This can only be the case when portal and file server functionality is provided on a machine with a single address for such purposes. (Recall, e.g., the file server and portal 250 of FIG. 2.) If so, the transaction is passed to the local peripheral storage interface operation(s) via the local file operation(s), as indicated by block 630. (Recall, e.g., operations 226b and 228b of FIG. 2.) The method 234' is then left via RETURN node 650.

Referring back to conditional branch point 620, if it is determined that the file server identified differs from the portal machine, the transaction is passed to network interface operation(s) 640, before the method 234' is left via RETURN node 650.

Figure 7:
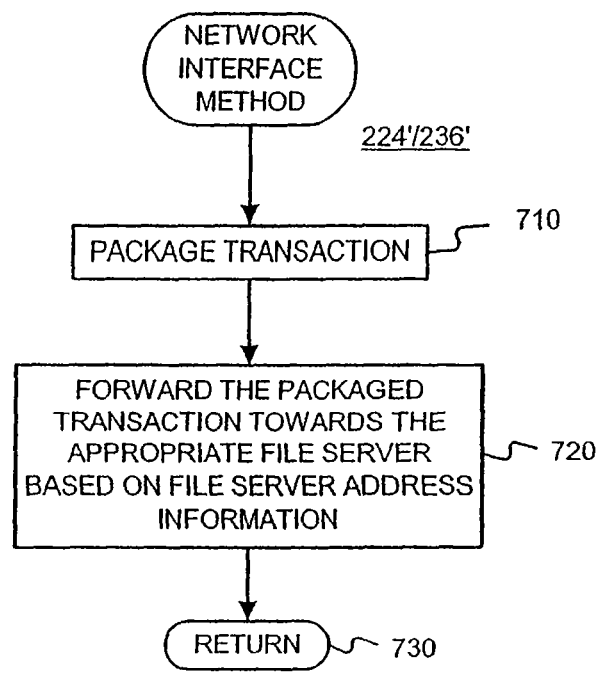
FIG. 7 is a flow diagram of an exemplary method that may be used to effect a network interface operation.

FIG. 7 is a flow diagram of an exemplary method 236' that may be used to effect a network interface operation 236. Upon receipt of a transaction, the transaction is "packaged" for forwarding towards the appropriate file server, as indicated by block 710. For example, if the appropriate file server has an IP address, the transaction may be carried as data in an IP packet. The packaged transaction is then forwarded towards the appropriate file server based on the file server address information, as indicated by block 720. The method 236' may then be left via RETURN node 730. A complementary method 224', not shown, can be used to unpackage a transaction (and save the address of the portal server) when it reaches the appropriate file server.

Figure 8:
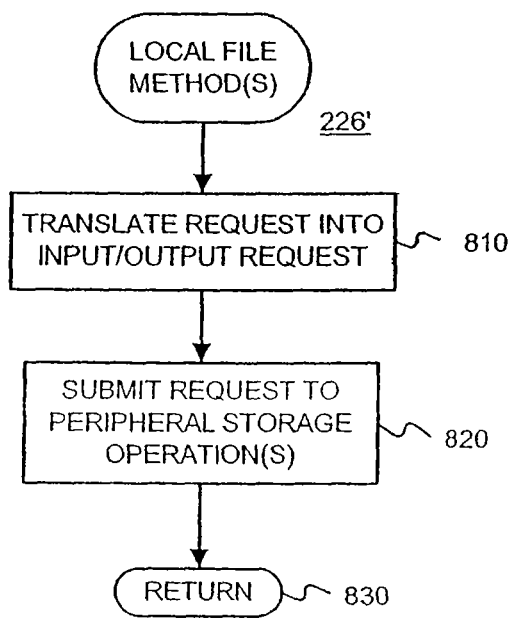
FIG. 8 is a flow diagram of an exemplary method that may be used to effect local file operations.

FIG. 8 is a flow diagram of an exemplary method 226' that may be used to effect local file operations 226. First, as indicated by block 810, the request is translated into input/output requests. These requests are then submitted to the peripheral storage operation(s) 820. The method 226' is then left via RETURN node 830.

Having described various exemplary methods that may be used to effect various operations, exemplary apparatus for effecting at least some of such operations are described in §4.3.3 below.

Exemplary Apparatus

Figure 9:
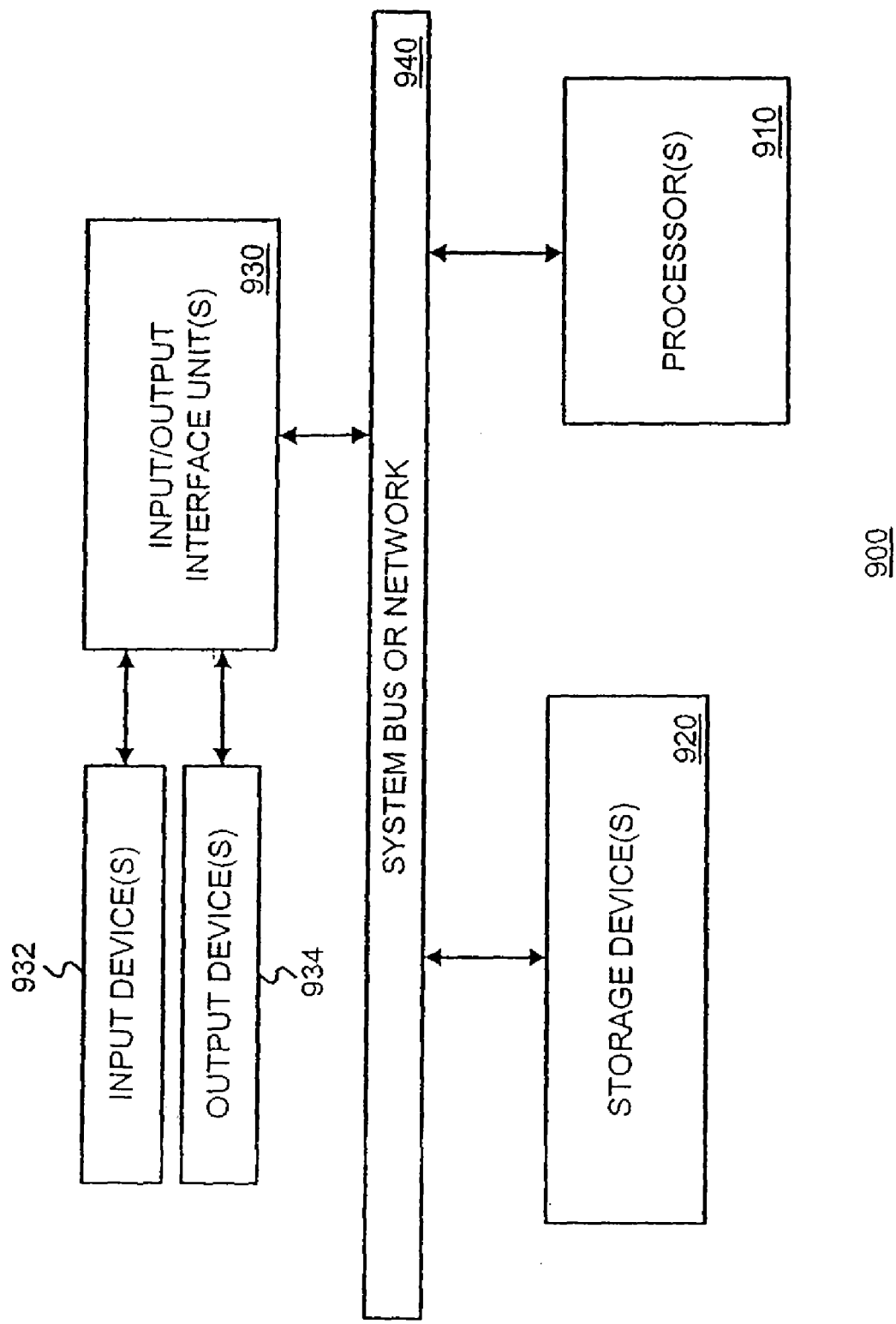
FIG. 9 is a block diagram of apparatus on which various operations of the present invention may be effected, and on which various data structures and files may be stored.

FIG. 9 is high-level block diagram of a machine (e.g., a computer, a personal computer, a hand-held computer, a network server, etc.) 900 that may effect one or more of the operations discussed above. The machine 900 basically includes a processor(s) (e.g., microprocessors, ASICs, etc.) 910, an input/output interface unit(s) 930, a storage device(s) (e.g., RAM, ROM, disk-based storage, etc.) 920, and a system bus or network 940 for facilitating the communication of information among the coupled elements. An input device(s) 932 and an output device(s) 934 may be coupled with the input/output interface(s) 930.

The processor(s) 910 may execute machine executable instructions to effect one or more aspects of the present invention. At least a portion of the machine-executable instructions may be stored (temporarily or more permanently) on the storage device(s) 920 and/or may be received from an external source via an input interface unit 930.

EXAMPLES OF OPERATIONS OF EXEMPLARY EMBODIMENT

In an exemplary embodiment of the present invention, every basic file system function, whether client-oriented (e.g., read, write, etc.) or system-oriented (e.g., format disk, create file system, de-fragment disk, etc.) is viewed as a simple transaction object containing (atomic file operation) command substructures with slots for input parameters and results. The thread, which generates the transaction, will know how to set or read these input/output slots.

In the exemplary embodiment, each transaction type can be thought of as having two functions associated with it—a processing function and a packaging function. The processing function has two modes—a query mode and a normal mode. In the query mode, the function simply provides the caller (the main thread) with the file system and controlling Inode number of a specific transaction to be used to determine where the transaction must be processed. In the normal mode, the function performs whatever work is necessary to satisfy the file-system function. The packaging function handles packaging or un-packaging the input or output data of the transaction for transport between (portal and file server) hosts.

In addition, in the exemplary embodiment, each transaction has function-specific state variables used by the processing function. Each processing function is written to carefully track progress in executing the file system request so that at any point it may pass control over the transaction object to another process while awaiting a required resource, and then resume execution where it stopped when the resource becomes available. In effect, then, transactions are implemented as atomic file operations. These atomic file operations "block" individually, so that the threads themselves never have to.

To better understand how to read or write pages on disk (or some other storage medium), examples of operations of an exemplary embodiment of the present invention is now described. More specifically, an example of a file read is described in §4.4.1 with reference to FIG. 10. Then, an example of a file write is described in §4.4.2 with reference to FIG. 11.

In both cases, it must be understood that whenever a transaction needs to wait for a resource, such as a file for example (e.g., because it needs to be read from the disk, or because another transaction has it locked), the transaction may be queued while it waits for the resource to become available. In one embodiment, within the transaction (processing routine) itself, a transaction pointer is set to NULL. Whether or not the transaction pointer is valid (not NULL and with no error code) may be checked constantly. In addition, state variables within the transaction command structure may be maintained so that when the resource becomes available and the transaction is placed back into the execution queue, the transaction starts at the appropriate place (e.g., at the appropriate atomic file operation).

The following description follows the logic in the following code fragment. The command pointer is a pointer to some typical transaction structure (referred to as an Ibrix transaction structure without loss of generality) with the following members (perhaps among others). Assume that all members have been initialized to zero or NULL.

```
Typical_Cmd {
    /* Inputs */
    File_System *fs;      /* Current file system */
    int          iseg;     /* Segment of sought block */
    int          address;  /* Address of sought block */
    /* Workspace variables */
    Cpage *page;
    int          have_lock;
};
#define NORMAL_PAGE 0
```

In each of the following examples provided in §§4.4.1 and 4.4.2, it is assumed that the relevant file (e.g., the relevant Inode and the data associated with the relevant Inode) is stored on, or is to be stored on, a (file server) unit other than the (portal) unit receiving the file call.

Example of a Read Operation

Figure 10:
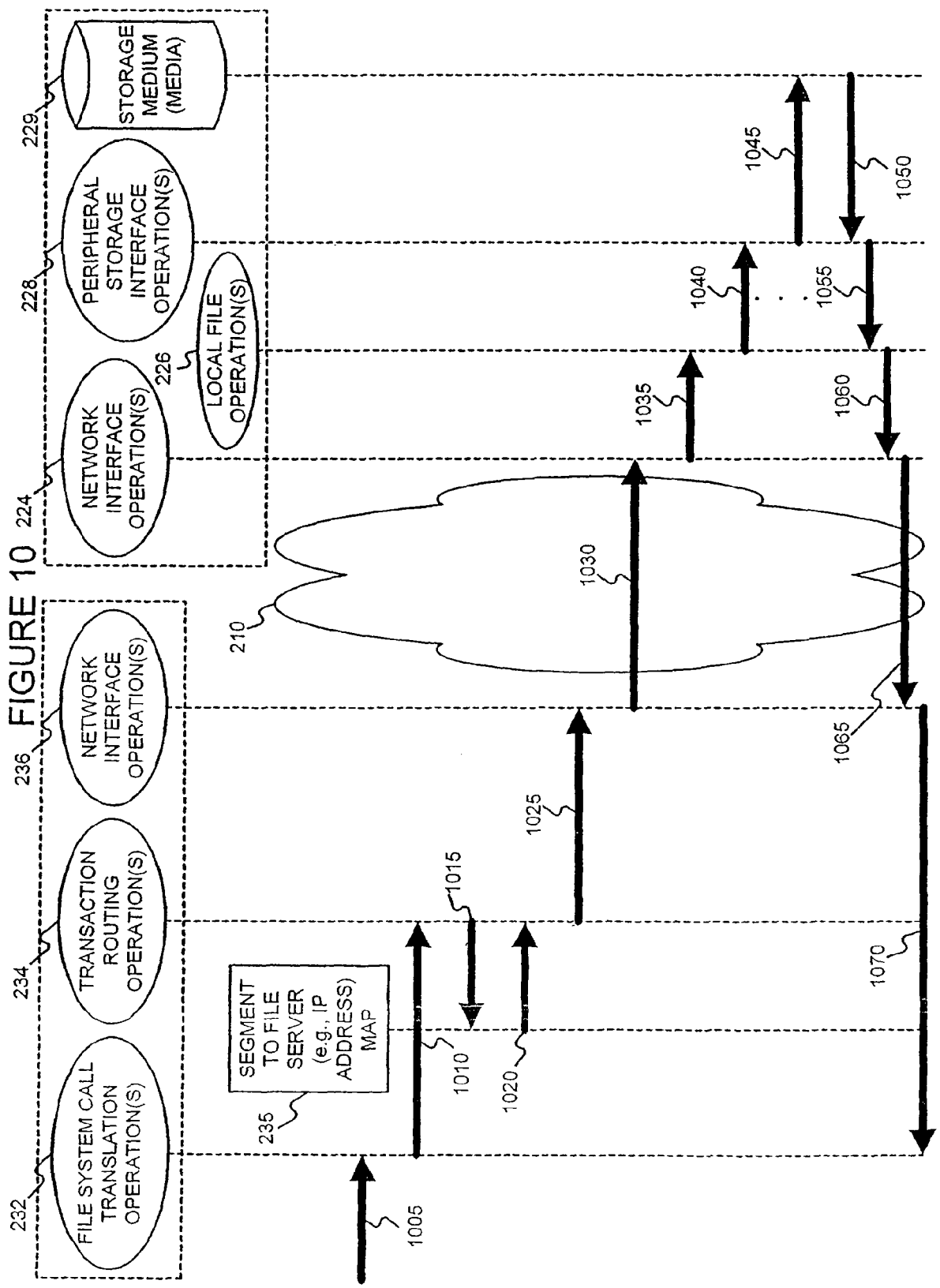
FIG. 10 is a messaging diagram that illustrates a read operation in an exemplary embodiment of the present invention.

FIG. 10 illustrates communications between operations in an exemplary sequence for executing a file system read request. A client (user) process (not shown) issues a file system call 1005 which is accepted by the file system call translation operation(s) (e.g., thread) 232. The operation 232 translates the client's file system call to a file system call having a transaction object-command syntax. More specifically, the request enters a file system call translation operation(s) (e.g., thread) 232. The operation(s) 232 allocates a transaction structure, fills in the operating system specific command substructure with the input parameters, and forwards the transaction to the transaction routing operation(s) 234 (e.g., places the transaction in the transaction router operation(s) thread input queue) as indicated by communication 1010.

The transaction routing operation(s) (e.g., thread) 234 calls the appropriate processing routine in query mode, obtaining the controlling Inode number of the request and the file system. The routing operation 234 computes the segment on which the controlling Inode resides. Then as indicated by communications 1015 and 1020, using the segment number, and the segment to file server address map 235, the routing operation 234 determines a server address. As stated above, in this example, the file server is remote. Since the segment is determined to be on another (file server) unit, the transaction routing operation(s) (e.g., thread) 234 marks the destination in the transaction and forwards the transaction to the network interface operation(s) 236 (e.g., puts the transaction on the input queue of the network interface operation(s) thread) as indicated by communication 1025.

The network interface operation(s) (e.g., thread) 236 calls the packaging routine on the transaction and forwards the packaged transaction to the appropriate (file server) unit as indicated by communication 1030. At the appropriate (file server) unit, the network interface operation(s) (e.g., thread) 224 calls the packaging routine to un-package the transaction and passes the transaction on to its local file system operation(s) (e.g., thread) 226 as indicated by communication 1035.

When the local file system operation(s) (e.g., thread) 226 determines that a read transaction is to be processed on the current machine, possibly after it has received the read transaction from another machine via the network interface operation(s) (e.g., thread) 224, it 226 then uses the normal mode processing routine to satisfy the file system function. This may actually involve multiple cycles through the processing function as the read transaction must typically wait for various resources to come available at different points in the function. (See, e.g., communications 1040 and 1045). As described below, the read transaction, performed at the local file operation(s) 226, may include pin, lock, and read&release commands.

The following illustrates three stages of an exemplary read operation:

```
Xaction *typical_read (Xaction *xact, Inum *inum) {
    ...
    /* 1. Pin the page */
    if (X_VALID(xact)) {
        Segment *segment = cmd->fs->segments[cmd->iseg];
        int n_pages = 1;
        cmd->page = pin_or_load_pages(&xact, cmd->address,
                                      NORMAL_PAGE, n_pages,
                                      segment);
        /* NOTE: xact may now be NULL! */
    }
    /* 2. Lock for reading */
    if (X_VALID(xact) && cmd->have_lock == 0) {
        if (set_read_lock(cmd->page, PAGE_INDEX(cmd->address),
                          &xact)) {
            cmd->have_lock = 1;
        }
        /* NOTE: xact may be NULL here! Note that in version
         * 1.0, set_read_lock takes a pointer to the xact,
         * not its address. In that case, we must have an
         * else clause which explicitly sets xact to NULL
         */
    }
    /* 3. Read & release */
    if (X_VALID(xact)) {
        char *buf = cmd->page->pages[PAGE_INDEX
                   (cmd->address)];
        .../* Read the buffer */
        unset_read_lock(cmd->page,
            PAGE_INDEX(cmd->address));
        unpin_cache_page(cmd->page,
            PAGE_INDEX(cmd->address));
        xact->info |=IB_DONE;
    }
    return xact;
}
```

The first stage of the read command, indicated by:

/* 1 Pin the page*/ loads the page into the cache from the disk and pins it for use. This first stage is quite simple, but it is also the most frequent type of action to take in any transaction in the file system of the present invention. Whether a page is to be read or modified, the system must first get it.

A routine checks whether the page already exists in the local cache. If so, it attempts to pin it on behalf of the calling transaction. If the page is not available from the local cache, the routine generates a request to load the page to the disk and places the request on the input queue of a peripheral storage interface operation(s) thread. The transaction pointer is also recorded in the load request so that the thread may place it in the wait queue of the page once it has created it. Once recorded, the pointer is set to NULL. Note that the pointer may also become NULL if the page existed in the local cache, but the pin failed.

Assuming that the first time through, the page was not available in the local cache, the transaction will be placed back in the local file system operation(s) thread queue once the page has been loaded. Note that the same instructions as before will be re-executed, e.g., until they succeed.

In the second stage of the read command, indicated by:

/* 2. Lock for reading*/ the page is locked so that the contents can be read without any danger of another thread modifying the page during such a read. The function that sets the lock performs in the same manner as the pin function.

An additional state variable (cmd->have_lock) is introduced. This state variable is not absolutely necessary in the example routine as written here, since there are no subsequent places in the routine where the transaction will have to wait on a queue. However, in general, it may be necessary to introduce some state variable to ensure that the same lock is not retried on a subsequent entry into the routine on the same transaction.

Once the page is locked by the transaction, in a third stage of the read command, indicated by:

/* 3. Read & release*/ the page is read. Once done with the read, the transaction will release the lock and unpin the page. Note that, if further use of the same page is anticipated, the transaction might unset the read lock, but not unpin. It is then important to ensure that when the transaction is done, it will then unpin the page.

Once done (See, e.g., communications 1050 and 1055), the read transaction (i.e., the file, etc.) is passed back to its source. The read transaction may go directly to the file system call translation operation(s) (e.g., thread) 232, and thence to the client (user) that made the original file system call. Alternatively, the transaction may pass through the network interface operations (e.g., threads) 224 and 246 to be passed back to the original (portal) unit, and thence to the file system call translation operation(s) (e.g., thread) 232 there (as indicated by communications 1060, 1065 and 1070), and then to the client (user) that made the original file system call.

Example of a Write Operation

Figure 11:
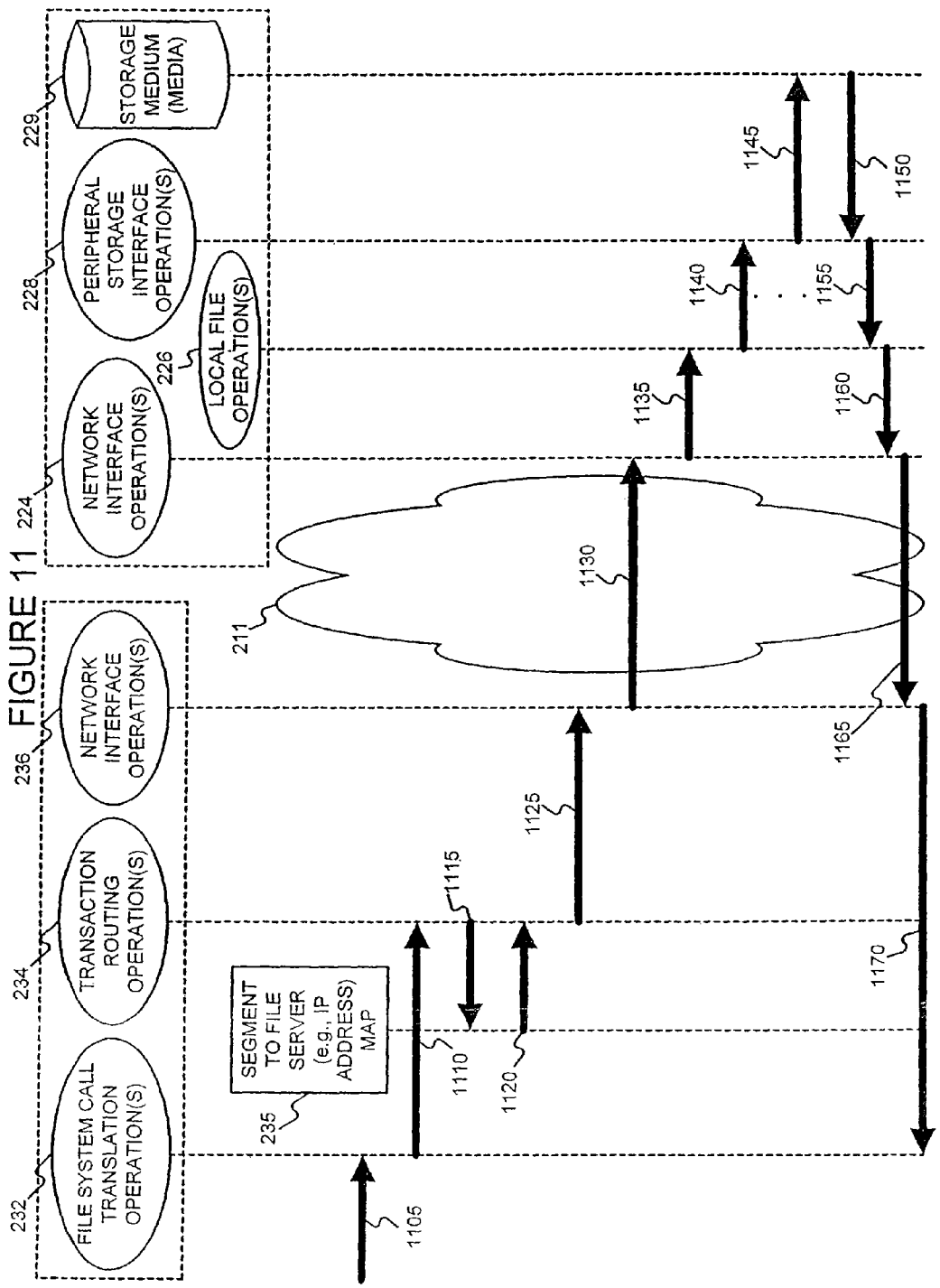
FIG. 11 is a messaging diagram that illustrates a write operation in an exemplary embodiment of the present invention.

FIG. 11 illustrates communications between operations in an exemplary sequence for executing a file system write request. A client (user) process (not shown) issues a file system call 1105 which is accepted by the file system call translation operation(s) (e.g., thread) 232. The operation 232 translates the clients file system call to a file system call having a transaction object-command syntax. More specifically, the request enters a file system call translation operation(s) (e.g., thread) 232. The operation(s) 232 allocates a transaction structure, fills in the operating system specific command substructure with the input parameters, and forwards the transaction to the transaction routing operation(s) 234 (e.g., places the transaction in the transaction router operation(s) thread input queue) as indicated by communication 1110. If the file has not yet been written to the file system, then the file system call translation operation(s) 232 may assign a globally unique file identifier (FID) (e.g., an Inode number). Such FID (Inode number) assignment may be based on policies and/or a global state of the file system.

The transaction routing operation(s) (e.g., thread) 234 calls the appropriate processing routine in query mode, obtaining the controlling Inode number of the request and the file system. The operation 234 computes the segment on which the controlling Inode is to reside. Then as indicated by communications 1115 and 1120, using the segment number, and the segment to file server address map 235, the operation 234 determines a server address. As stated above, in this example, the file server is remote. Since the segment is determined to be on another (file server) unit, the transaction routing operation(s) (e.g., thread) 234 marks the destination in the transaction and forwards the transaction to the network interface operation(s) 236 (e.g., puts the transaction on the input queue of the network interface operation(s) thread) as indicated by communication 1125.

The network interface operation(s) (e.g., thread) 236 calls the packaging routine on the transaction and forwards the packaged transaction to the appropriate (file server) unit as indicated by communication 1130. At the appropriate (file server) unit, the network interface operation(s) (e.g., thread) 224 calls the packaging routine to un-package the transaction and passes the transaction on to its local file system operation(s) (e.g., thread) 226 as indicated by communication 1135.

When the local file system operation(s) (e.g., thread) 226 determines that a write transaction is to be processed on the current machine, possibly after it has received the write transaction from another machine via the network interface operation(s) (e.g., thread) 224, the local file system operation 226 then uses the normal mode processing routine to satisfy the file system function. This may actually involve multiple cycles through the processing function as the read transaction must typically wait for various resources to come available at different points in the function. (See, e.g., communications 1140 and 1145). As described below, the write transaction, performed at the local file operation(s) 226, may include pin, lock, and write&dirty commands.

The first two stages of modifying an existing disk block (as opposed to allocating a new block to write to) are essentially identical to the first two stages of the read transaction described in §4.4.1 above, except that the lock request is set_write_lock rather than set_read_lock. Only the code beginning at stage 3 is shown.

```
Xaction *typical_write (Xaction *xact, Inum *inum) {
    ...
    /* 1. Pin the page - as in read */
    /* 2. Lock for writing - analogous to read */
    /* 3. Write & dirty */
    if (X_VALID(xact) && cmd->did_write == 0) {
        char *buf = cmd->page->pages
            [PAGE_INDEX(cmd->address)];
        ... /* Make changes to the buffer */
        unset_write_lock(cmd->page,
            PAGE_INDEX(cmd->address),
                            (IBC_PAGE_DIRTY|
                             IBC_PAGE_LOCK_FLUSH));
        cmd->did_write = 1;
        wait_on_page_queue(cmd->page, &xact);
```

-continued

```
        /* NOTE: xact is now NULL! */
    }
    if (X_VALID(xact) && cmd->did_write) {
        int iw = PAGE_INDEX(cmd->address);
        if (cmd->page->info[iw] & IBC_PAGE_READY) {
            /* We are DONE! */
            unset_flush_lock(cmd->page, iw);
            unpin_cache_page(cmd->page, iw);
            xact->info |= IB_DONE;
        }
        else {
            wait_on_page_queue(cmd->page, &xact);
        }
    }
    return xact;
}
```

The difference from reading occurs at the point when the transaction unlocks the page. Unlike reading, writing changes the contents of the page. Thus, when the transaction unlocks the page, the cache is informed that the transaction modified the page. This may be done by passing the IBC_PAGE_DIRTY flag. Setting this flag on the page will cause it to be placed in the dirty-page queue to be written to disk the next time the cache thread executes.

If it is desired to confirm that a write of the new data has actually occurred, along with the IBC_PAGE_DIRTY flag, the transaction may also set a flush lock. (See, e.g., communications 1160, 1165 and 1170). Typically, the page cannot actually be written until the transaction exits and the cache thread executes, so the transaction explicitly places itself on the page wait queue.

Once the write has occurred, the transaction will be placed back on the local file system operation(s) thread's input queue and it will reenter this routine. The transaction can verify that it is indeed here because the write completed (by checking the PAGE_READY flag). If not, the transaction can re-insert itself on the page queue. If so, the transaction can unset the flush lock, unpin the page and exit.

Note that if verifying the write is not necessary or not desired, then in the third stage of the transaction could have done the following:

```
/* 3. Write & dirty */
if (X_VALID(xact) && cmd->did_write == 0) {
    char *buf = cmd->page->pages[PAGE_INDEX(cmd->address)];
    ... /* Make changes to the buffer */
    unset_write_lock(cmd->page, PAGE_INDEX(cmd->address),
                    IBC_PAGE_DIRTY);
    unpin_cache_page(cmd->page,
        PAGE_INDEX(cmd->address));
    xact->info |= IB_DONE;
}
```

As before, the cache will process the write, but it is not confirmed.

In one exemplary embodiment of the present invention, the maximum length of a file name is 8191 characters (i.e., one file system block). Within the directory structure itself, however, only 42 (constant MAX_FAST_NAME_SIZE) characters may be recorded. If the name exceeds this size, it is replaced by a 16-byte number computed by a message digest algorithm (the MD5 algorithm, See, e.g., RFC 1321 which is incorporated herein by reference) for lookup/comparison purposes, plus a pointer to a block containing the name itself.

CONCLUSIONS

As can be appreciated from the foregoing, the present invention teaches a file system that can span a disparate mix of heterogeneous units such as portals, files servers, and combinations thereof. These units are connected over one or more networks and are managed and administered on a global basis. Consequently, at least some systems implemented in accordance with the present invention allow the transparent addition of any resources into the overall system without the need for planning or downtime.

As far as a client (user) is concerned, the entire file system resides on a portal unit. As long as the protocols used by the client employ file-locking procedures, any or all servers participating in a file system of the present invention may act as portal machines.

The Inode mapping convention allows a distributed file system to be realized.

OTHER PREFERRED EMBODIMENTS

Other embodiments are within the scope and spirit of the invention. For example, while the description above discussed transferring a call to a file server that owns and controls the data associated with an incoming read request, or to a server that will own and control data associated with an incoming write request, a system according to the invention can provide for authorization for a server to access another server's associated storage for reading and writing data.

Figure 12:
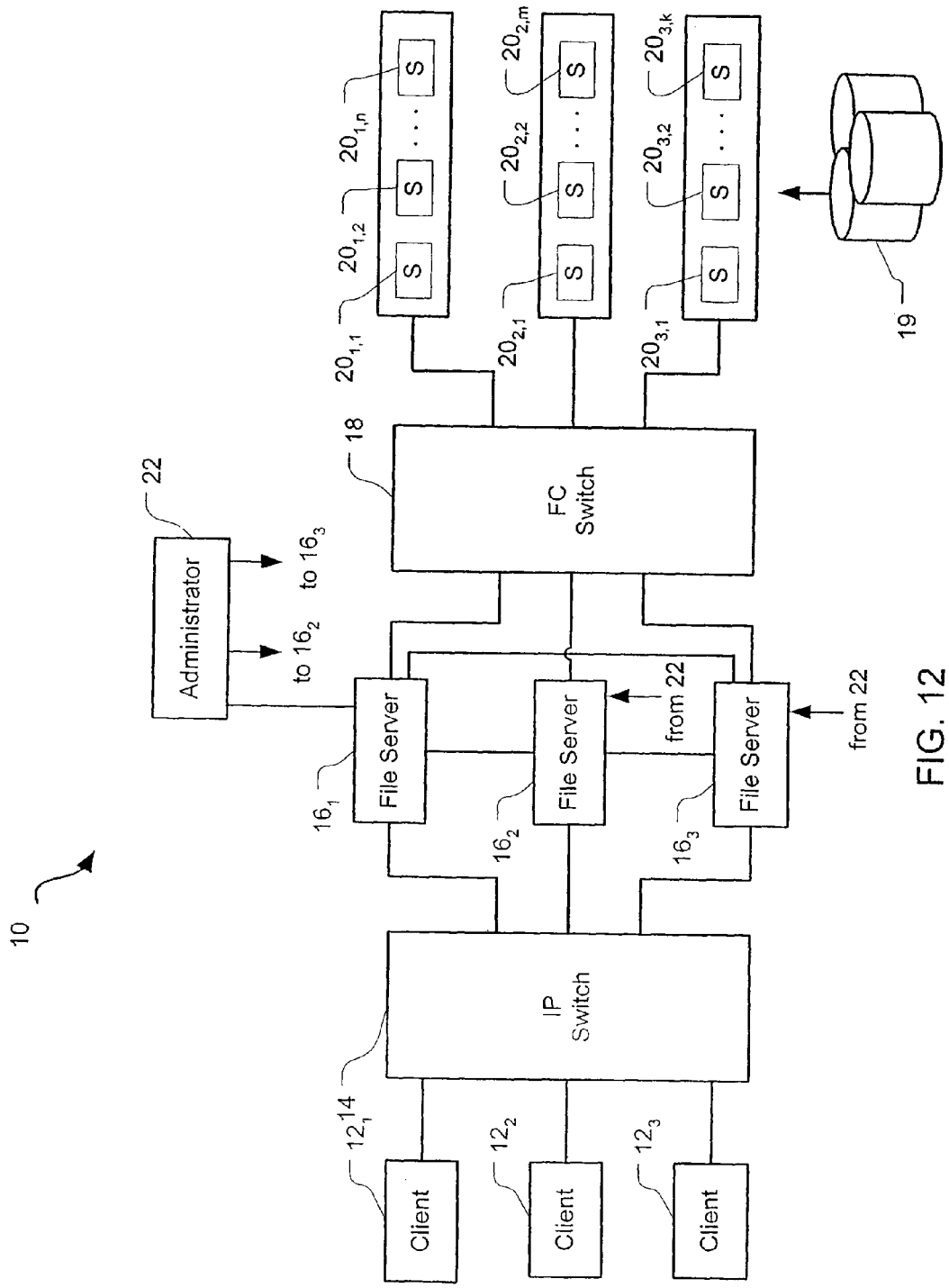
FIG. 12 is a simplified block diagram of a distributed-file system.

Referring to FIG. 12, a data storage and access system 10 comprises clients $12_1$-$12_3$, an IP switch 14, file servers $16_1$-$16_3$, a fiber channel (FC) switch 18, storage 19, and an administrator 22. Although three clients 12 and three file servers 16 are shown, other numbers of these devices/systems may be used, and the quantities of the items need not be the same. The storage 19 can be any of a variety of physical media, such as disks, and provides virtualized of a file system. As indicated in FIG. 12, the storage 19 stores segments $20_{m,n}$ that are portions of a file system and that may be stored anywhere physically on the storage, but whose data are logically grouped into the segments 20. Segments are typically incomplete portions of the file system in that they may refer to file system entities in other segments. For example, a directory/folder of files in the segment $20_{1,3}$ can refer to other segments 20, e.g., the segment $20_{2,1}$ and/or the segment $20_{3,2}$ with addresses in these other segments $20_{2,1}$, $20_{3,2}$ where the corresponding files are stored. A group of the segments 20 is associated with, and controlled by, a corresponding one of the servers 16. For example, the segments $20_{1,x}$ are associated with and controlled by the server $16_1$, etc. The servers 16 control the segments 20 in that the servers 16 arbitrate access to the segments 20, particularly modifying metadata including allocating file system blocks, modifying directories, etc. The file servers 16 can be any device or portion of a device that controls segment access. The system 10 provides a distributed file system in that segments of the file system are dispersed across the storage 19 such that it is not required that the file system be controlled by one server 16 and allows for a plurality of servers 16 to simultaneously control portions of the file system. The clients 12 and the IP switch 14, the IP switch and the file servers 16, the file servers 16 and the FC switch 18, and the FC switch 18 and the storage 19 are configured and coupled for bi-directional communication. Transmission apparatus other than the FC switch 18 would be acceptable, such as an iSCSI device or any of numerous high-speed interconnects available now or in the future. Further, the file servers 16 are configured and coupled for bi-directional communication with each other and with the administrator 22.

Any of the file servers 16 may be general computing devices, such as personal computers, workstations, etc. The file servers 16 may have their own local storage instead of or in addition to the storage 19 and can control/manage segments of a file system on their local storage. The file servers 16 may be clustered to work on a common issue and the clustered servers 16 may be managed/regulated in accordance with the invention.

The file servers 16 are configured to request access authorization for files located in segments that are owned/controlled by another file server 16. As discussed above, the file servers 16 are computer systems that include processors and memories that store software instructions that are readable and executable by the processors to carry out a variety of functions. Included in these functions are the abilities to request authorization to access a file system segment controlled by another file server 16, and to grant authorization to another file server 16 that requests access to a file system segment controlled by itself.

Each file server 16 is preferably configured to be able to request and act upon authorization for access to a file system segment controlled by another server 16. Each server 16, e.g., the server $16_1$, can determine that an incoming call from a client requires access to a segment controlled by another server 16, e.g., the server $16_3$, e.g., for reading a file from the segment or writing a file to the segment. The server $16_1$ is configured to send an authorization request to the appropriate server, here the server $16_3$, requesting authorization for access to the appropriate file system segment. The request will contain the FID of the desired file, here the Inode number (or FCB). The server $16_1$ is configured to wait for and receive an authorization from the other server $16_3$ that includes the Inode corresponding to the Inode number provided in the authorization request. The server $16_1$ is configured to search the returned Inode for the address(es) of the appropriate block(s) in the file that the server $16_1$ will access to properly respond to the incoming call (e.g., to find the appropriate blocks of information to read).

Each file server 16 is further configured to receive, process, and respond to access authorization requests from another file server 16. Each server 16 can receive an incoming request for access to a file with a designated Inode number. The server 16 can process the request to search the server's associated/controlled segment(s) 20 to find the Inode corresponding to the Inode number. The Inode has a fixed size, e.g., 64 bytes or 128 bytes, etc., for a given system (implementation) but the size of the Inode may vary from implementation to implementation. The Inode includes the addresses of blocks associated with a file. The referenced blocks may contain data for the file and/or further addresses of further blocks where actual data, and/or still further addresses, are stored. The addresses may refer to other segments 20, including segments controlled by a server 16 other than the server 16 that controls the Inode. Each server 16 is further configured to send the found Inode to the server 16 that requested access to the file associated with the Inode.

The file servers 16 are further configured to produce, delete, and modify Inodes as appropriate. As new disks or other storage media are added to the storage controlled by a file server 16, the server 16 can produce new Inodes, or modify existing Inodes to reference addresses of the new storage media. Further, existing Inodes can be modified or deleted, e.g., as files or portions of files are deleted. Such modifications to Inodes occur essentially instantly and transparently to the clients 12, with no apparent downtime of the file server 12 performing the modification.

Also, the servers 16 can assign FIDs and allocate memory for write requests to segments 20 that the servers 16 control. Each of the servers 16 can pre-allocate an amount of memory for an incoming write request. The amount of pre-allocated memory can be adjusted and is preferably a fixed parameter that is allocated without regard, or even knowledge, of a quantity of data (e.g., a size of a file) to be written. If the pre-allocated memory is used up and more is needed, then the requesting server 16 can request more memory, and the server 16 that controls the appropriate segment 20 can pre-allocate another portion of memory. The server 16 that controls the segment 20 to be written to will allocate an FID (e.g., an Inode number). The controlling server 16 can supply/assign the Inode number and the Inode, complete with storage block addresses. If not all of the pre-allocated block addresses are used by the write, then the writing server 16 will notify the controlling server 16 of the unused blocks, and the controlling server 16 can de-allocate the unused blocks and reuse them for future write operations.

The administrator 22 is configured to monitor the file servers 16, and collect information from and disseminate information to the file servers 16. The administrator 22 is also configured to allocate Inode numbers for new segments 20. The administrator 22 can determine when a file server 16 and/or storage (and thus room for new segments 20) is added to or removed from the system 10, determine appropriate new Inode numbers, and provide information to the file servers 16 so that the servers 16 can determine which file server 16 controls a particular segment 20 of the file system. For example, the administrator 22 can provide information to affect how the file servers 16 determine which file server 16 controls the file segment 20 associated with an incoming request. This may include, e.g., providing information to alter a mapping of segments 20 and file servers 16, or information to modify an algorithm used by the file servers 16 to determine the controlling file server 16 from an FID.

The administrator 22 is configured to help the servers 16 migrate ownership/control of the segments 20 of the file system. The administrator 22 and servers 16 can move ownership of the segments 20 without moving the data of the segments 20. The migration can be essentially instantaneous. For example, the administrator 22 can compute and disseminate new mappings (e.g., tables), and/or edits to existing mappings (e.g., tables), linking segments and file servers 16. The edits can indicate changes from the current mapping to a new mapping. The administrator 22 also propagates a future time at which each of the servers 16 whose set of segments 20 is affected by the migration will replace or update the old mapping. If no segment 20 associated with a server 16 is affected, then that server 16 may replace or revise its mapping at a time later than the common time at which the affected servers 16 replace/update their mappings. Multiple servers 16 with no affected segments 20 may replace/update their mappings at different times (both from the common time and from each other). The old mappings can be replaced or edited by the servers 16 using the information from the administrator 22. Using this technique, new storage can be accommodated by replacing or amending the segment-to-server tables. Preferably, if a segment 20 is to be migrated from being under one server's control to another server's control, the administrator 22 quiesces the segment 20 by inhibiting any action to be taken regarding the segment 20 (e.g., reading from or writing to the segment 20). This can be accomplished, e.g., by instructing the current and new owner servers 16 to disallow any accesses to the segment 20. After the ownership migration for the segment 20 is completed, the administrator 22 allows access to the segment 20, e.g., by instructing the new owner that it can access, and authorize other servers 16 to access, the segment 20.

Mappings are preferably assigned version numbers, such as a number from a monotonically increasing series of integers, to help prevent older mappings mistakenly being used. The servers 16 can include the version number of the mapping used in formulating the request to help avoid race conditions. A receiving server 16 determines whether the mapping version of the request is older, newer, or the same as the receiving server's mapping. If the receiving server's mapping is older, then the receiving server 16 obtains the new mapping from the administrator 22. If the receiving server's mapping is the same, then the receiving server 16 processes the request. If the receiving server's mapping is newer than that used by the requesting server 16, then the receiving server 16 responds with a "map out of date" response that will cause the requesting server 16 to revalidate its mapping and act accordingly regarding the request.

Figure 13:
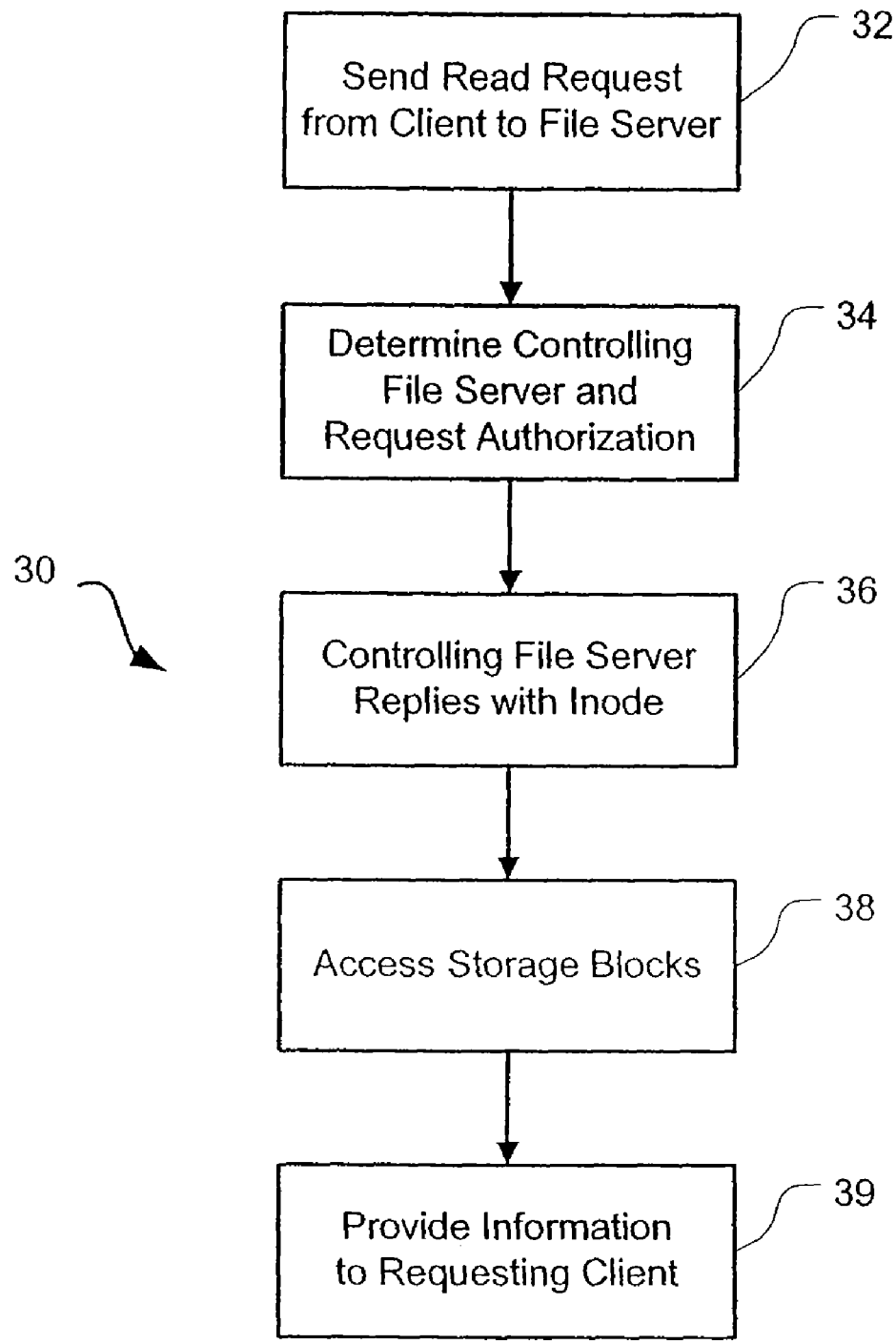
FIG. 13 is a block flow diagram of a process using a file server to access and read a file controlled by another file server, using the system shown in FIG. 12.
Figure 14:
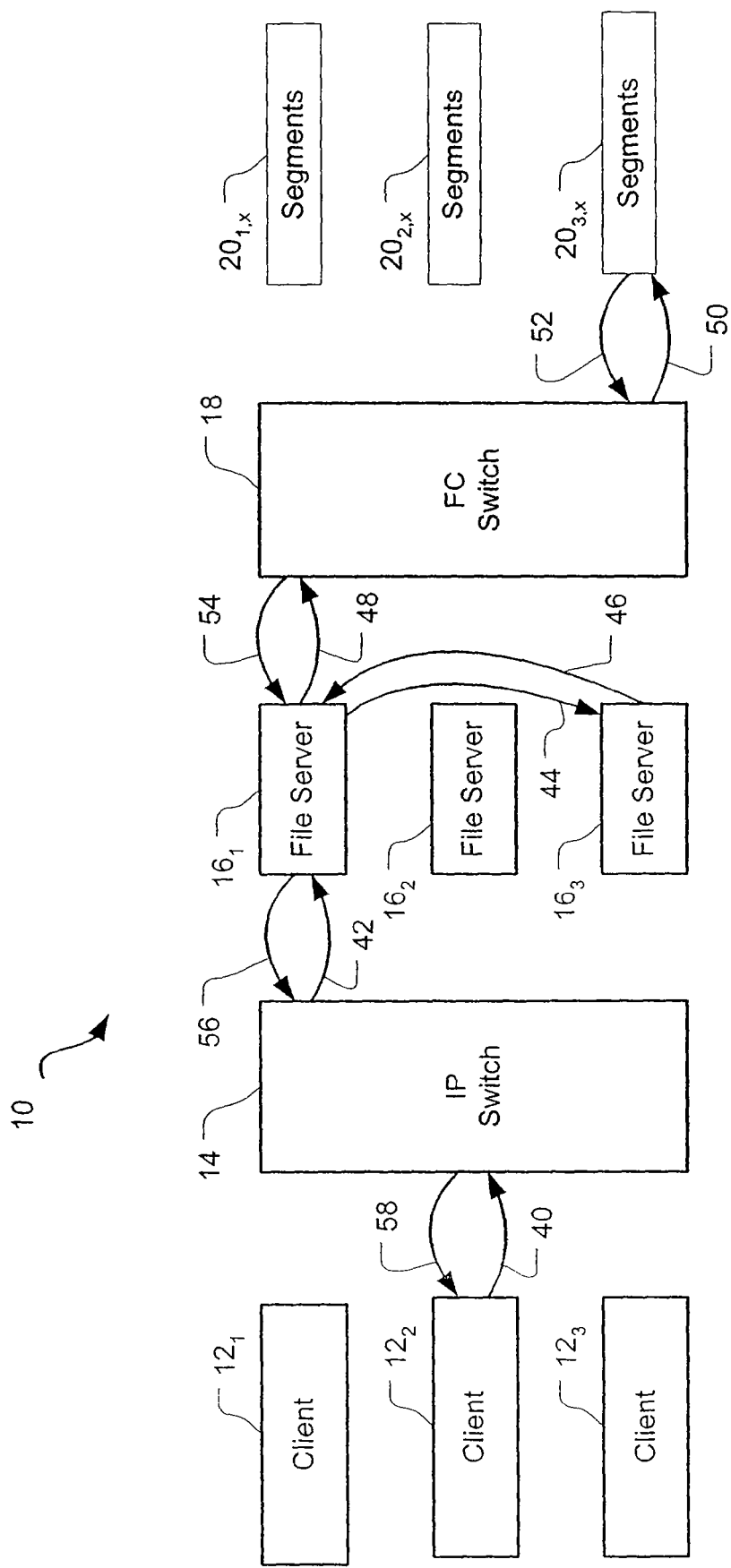
FIG. 14 is a simplified block diagram of communication flow in the system shown in FIG. 12 for an example of the process shown in FIG. 13.

In operation, referring to FIG. 13, with further reference to FIGS. 12 and 14, a process 30 for using one file server 16 to access and read a file controlled by another file server 16 using the system 10 includes the stages shown. The process 30, however, is exemplary only and not limiting. The process 30 can be altered, e.g., by having stages added, removed, or rearranged. For exemplary purposes, it is assumed that the client $12_2$ sends a read-request call that is received by the file server $16_1$ for a file that is controlled by the file server $16_3$ and is stored on one or more of the segments $20_{3,x}$. Other combinations of clients 12, file servers 16, and segments 20 may be involved in similar processes, including for writing to a file.

At stage 32, the client $12_2$ sends a read request to one of the file servers 16 via the IP switch 14. The client $12_2$ (and in particular an application running on the client $12_2$) sends a read request to the IP switch 14 as depicted by a communication 40. The IP switch 14 determines to which file server 16 to send the incoming call. This decision may be made in a variety of ways, such as randomly, or intelligently, e.g., to help balance the load of calls to the servers 16. In this example, the IP switch 14 sends the call to the file server $16_1$ as depicted by a communication 42.

At stage 34, the file server $16_1$ determines the server 16 that controls the file that the client $12_2$ wishes to read, and requests access authorization from that server 16, assuming the server 16 is not the controlling server 16. The server $16_1$ analyzes the call to determine the FID, here the Inode number, included in the call. From this Inode number, the server $16_1$ determines the server 16 in control of the corresponding file. The server $16_1$ can apply any appropriate mechanism for determining the appropriate controlling server 16. For example, the server $16_1$ could store a list or apply an algorithm that associates Inode numbers with servers 16. The server $16_1$ may instead store a list or apply an algorithm or function that associates Inode numbers with segments of the file system and use a list, algorithm, or function that associates segments with the servers 16. Other mechanisms may also be used to determine the appropriate server 16. Here, the server $16_1$ determines that the server $16_3$ owns/controls the segment containing the file (or file portion) corresponding to the Inode number. The server $16_1$ sends a communication 44 to the server $16_3$ containing the Inode number from the call 40 and requesting authorization to access the corresponding file.

At stage 36, the controlling file server $16_3$ receives the Inode number from the server $16_1$ and replies with the corresponding Inode. The server $16_3$ searches its associated segments $20_{3,x}$ using the received Inode number from the requesting server $16_1$ to find the corresponding Inode uniquely identified by the Inode number. The controlling file server $16_3$ replies with a communication 46 to the requesting file server $16_1$ containing the Inode corresponding to the Inode number of the call. The Inode preferably contains indicia of addresses of storage blocks of file data and/or further addresses of storage blocks from which all the data of the file associated with the Inode number of the call can be obtained. By providing the Inode, and thus the addresses (directly or indirectly) of the blocks storing the file, the communication 46 provides authorization to the requesting file server $16_1$ to access the associated storage blocks/file.

At stage 38, the requesting file server $16_1$ accesses and reads the appropriate blocks of data from the appropriate segment(s) 20 through the FC switch 18. The file server $16_1$ determines the appropriate blocks of data to be accessed by reading the Inode for the block addresses and possibly one or more levels of indirect addresses. The file server $16_1$ sends a communication 48 to the FC switch 18 with the appropriate block addresses. The switch 18 forwards the block addresses to the appropriate segment(s) 20, here the segment(s) $20_{3,x}$ owned by the file server $16_3$, in a communication 50. The segment(s) $20_{3,x}$ responds to the FC switch 18 in a communication 52 with the data from the referenced addresses. The switch 18 forwards the data to the file server $16_1$ in a communication 54 with the data from the blocks. Further communication between the server $16_1$ and the segment(s) $20_{3,x}$ may be carried out as appropriate if the contents of one or more blocks contained further addresses. In this case, the server $16_1$ determines which of these further blocks are to be read and communicates with the segment(s) $20_{3,x}$, or other segment(s) 20, accordingly.

At stage 39, the file server $16_1$ provides the information read from the segment(s) $20_{3,x}$ to the requesting client $12_2$. The server $16_1$ sends the read information in a communication 56 to the IP switch 14 that forwards the information to the requesting client $12_2$ in a communication 58.

Thus, preferably each of the servers 16 can act as an out-of-the-data-path metadata controller. The data path is the flow of data between the client 12 and the segment(s) 20. In FIG. 14, the data path is from the client $12_2$ through the IP switch 14, through the file server $16_1$, through the FC switch 18 to the segment(s) $20_{3,x}$ and back again. Thus, the server $16_3$ that controls the accessed file and that provided the metadata Inode to the in-path file server $16_1$ is the out-of-the-data-path controller in this example. Preferably each of the servers 16 can act as such a controller, but this is not required. The servers 16 can also act as in-the-data-path controllers if authorization from another server 16 is not needed.

A write request would proceed in much the same way as the read request. Primary differences would be that the Inode number would not be provided in the request, but would be produced or allocated, and data would not be read and provided to the client 12, but received from the client 12 and written to an appropriate segment 20. The Inode number would be allocated by the controlling server 16 in response to a request from the receiving file server 16. The controlling server 16 pre-allocates a quantity of memory as reflected in the Inode returned by the controlling server 16 to the requesting/receiving server 16. The receiving file server 16, after obtaining authorization if needed, would communicate with the requesting client 12 through the IP switch 14 to obtain the data to be written. The file server 16 would supply the data to the appropriate segment 20 through the FC switch 18 and the segment 20 would write the data to the referenced address(es). The communication from the segment 20 to the file server 16 and the file server 16 to the client 12 would not be performed to the extent of reading and sending data, but could be performed to the extent of confirming that the write operation was successful.

If the data requires more file system blocks than the controlling server 16 pre-allocated, then the receiving server 16 can request allocation of additional blocks by the controlling server 16. In response to such a request, the controlling server 16 pre-allocates additional blocks, and these blocks can be referenced directly or indirectly by the Inode associated with the written data. The requesting server 16 informs the controlling server 16 of the file system blocks ultimately used by the write operation so that the controlling server 16 can allocate the pre-allocated but unused file system blocks to future write operations. The informing of the controlling server 16 could be in the form of sending a final Inode to the controlling server 16. Using the invention, instead of sending mapping information for a requested portion of a file, the Inode information is sent irrespective of what portion of the file was requested. While the Inode may vary in accordance with the file size, it will not vary in accordance with the size of the portion of the file requested.

Further, while stage 36 described above assumed that a single Inode of a fixed size would be available for return to the requesting server 16 regardless of the size of the data requested, Inodes of different sizes may be available. For example, multiple discrete sizes of Inodes may be available e.g., to accommodate files with extended attributes. Also for example, the size of the Inode itself may depend on the size of the file. Which of multiple Inodes is returned to a requesting server 16 may be dependent upon, e.g., the size of the data to be read, the size of the file from which data are to be read, the attributes (of the file) requested, the portion of the file to be read, etc. Selection of which Inode to return can be performed in a variety of ways. For example, the largest or the smallest Inode may be selected, the Inode may be selected randomly from a set of Inodes, or may be selected depending upon size (e.g., successively larger Inodes being selected if the size of data stored and/or requested exceeds successively higher thresholds), etc. Other factors may also be used to determine which Inode to return, such as a limit on the number of indirect addresses to be included in the returned Inode. Combinations of techniques may also be employed, such as by returning the smallest Inode if the size of data requested is below a threshold, and randomly selecting an Inode if the requested data exceeds the threshold. Whether to return a single, fixed-size Inode, or one of a set of discrete-sized Inodes may be selectable, e.g., by a programmer of a server 16, or by an indication in a data or authorization request.

Figure 18:
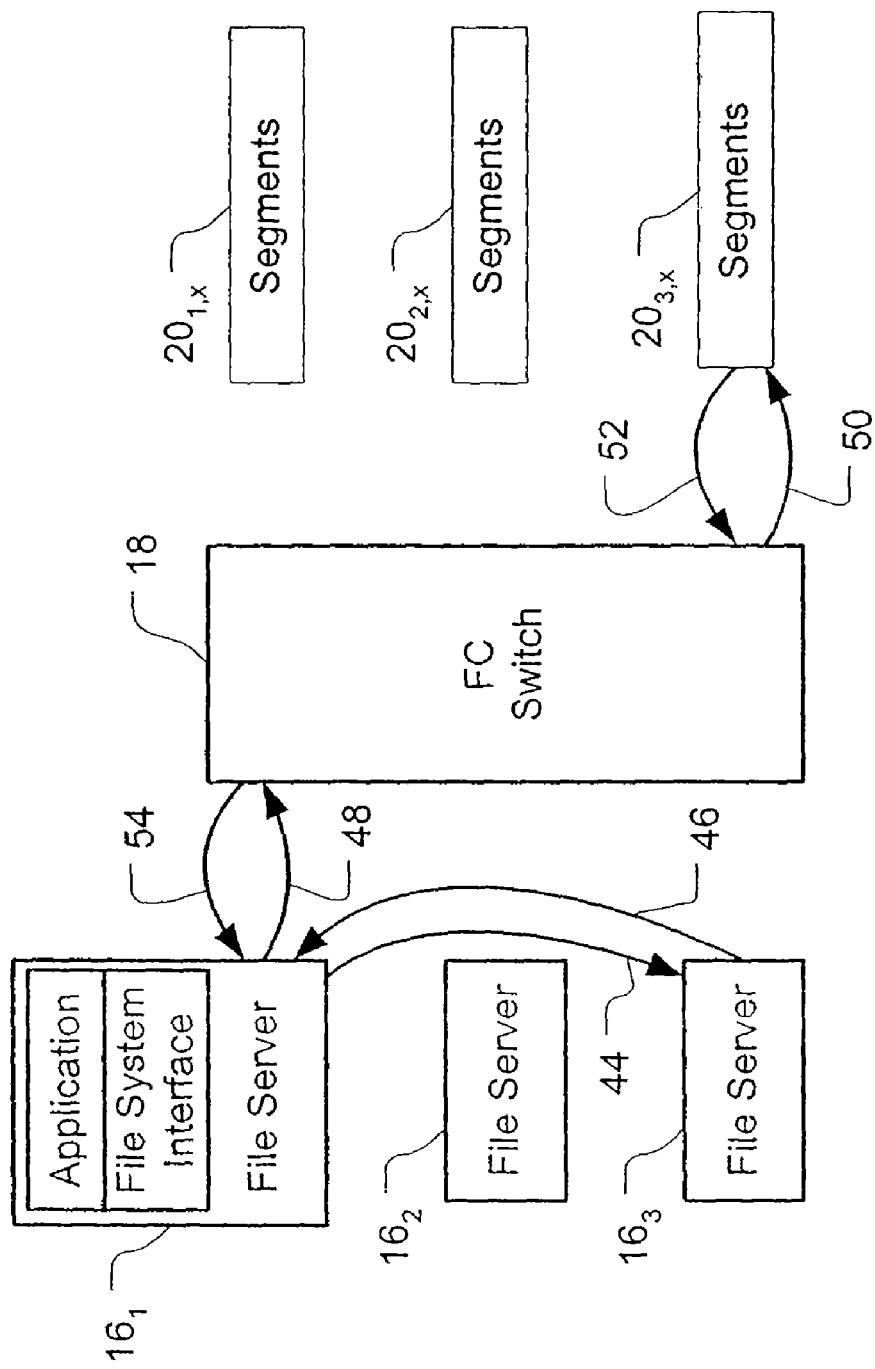
FIG. 18 is a simplified block diagram of communication flow in a system similar to the system shown in FIG. 12 with local, instead of remote, clients.

Referring to FIG. 18, the file servers 16 may alternatively, or also, receive requests from local clients running applications. Instead of, or in addition to, the remote clients 12 (FIG. 14) running applications that request access through the file servers 16, the file servers 16 themselves may have local clients that run applications that request access to the segments 20. In these instances, the local clients communicate through a file system interface with other portion of the file server 16 to access the segments 20 and thus the communications through the IP switch 14 (FIG. 14) are not needed, but otherwise the communications are similar to those described with respect to FIG. 14. Such an arrangement may be called a "clustered" arrangement.

Figure 15:
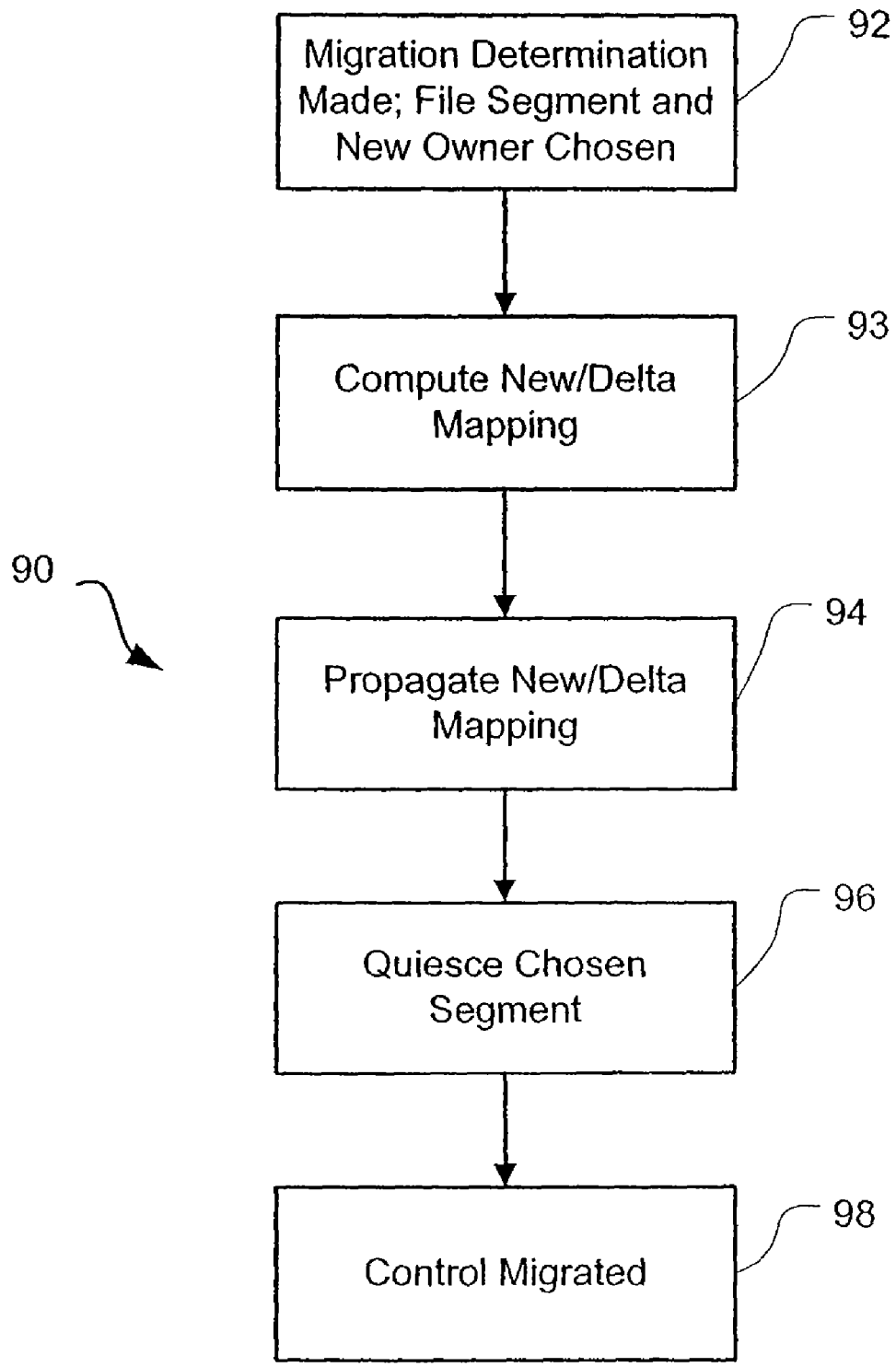
FIG. 15 is a block flow diagram of a process using the system shown in FIG. 12 to migrate ownership of a file segment.

Referring to FIG. 15, with further reference to FIG. 12, a process 90 for migrating ownership of a segment 20 using the system 10 includes the stages shown. The process 90, however, is exemplary only and not limiting. The process 90 can be altered, e.g., by having stages added, removed, or rearranged.

At stage 92, it is determined that an ownership migration is in order, a segment 20 to be migrated is chosen, and a new owner selected. For example, the administrator 22 may determine that there are presently too many accesses to a particular server's segments 20, causing less than desired performance (e.g., response time) for the controlled segments 20. The administrator 22 may further determine that migrating ownership of one or more of the segments 20 controlled by that server 16 will improve performance. The administrator 22 may also determine that migrating ownership of one or more of the segments 20 by a server 16 may increase reliability or may improve some other desirable characteristic of the system. The administrator 22 may decide to move control of one or more segments 20 to a selected server 16 because most/many requests for the segment(s) are received by the selected server 16. For example, the administrator 22 may determine that a client 12 "moved" in that the client 16 changed which server 16 the client 12 uses to access the file system and thus decide to move control of the segment(s) regularly accessed by that client 12 to the server 16 now used to access the file system. Thus, for one or more of various possible reasons, the administrator 22 chooses a segment 20 for which ownership is to be moved. The administrator 22 also chooses a file server 16 to take control of the chosen segment. For example, the new server 16 may be chosen because it can accommodate the load associated with the chosen segment 20, or may be chosen because it currently has a small load.

At stage 93, the administrator 22 computes a new mapping and/or a delta mapping and assigns a new version number. The administrator 22 determines complete new mappings of file servers 16 and segments 20 (e.g., a table associating them) and/or indicia of the changes to convert the most recent version of the mapping into a new mapping.

At stage 94, the administrator 22 propagates indicia of the new mapping. The administrator 22 sends the new mapping and/or the deltas reflecting the changes to convert to the new mapping to the servers 16. The administrator 22 also sends an indication of a future time at which the servers 16 will switch to the new mapping or implement the changes to convert to the new mapping. If less than all of the servers 16 have segments 20 either moved from or added to their control, then only those that do have at least one segment 20 removed or added to their control may switch to or convert to the new mapping at the designated time. Other servers 16 may switch to or convert to the new mapping later, possibly at different times for each of the remaining servers 16. Having the affected servers 16 switch substantially simultaneously helps make the transition to and implementation of the new mapping substantially seamless and transparent to any application using data from the file system.

At stage 96, the segment 20 chosen to be moved is quiesced in preparation for ownership migration. The administrator 22 instructs the server 16 presently controlling, and the server 16 that will control, the chosen segment 20 not to access or authorize access to the chosen segment 20.

At stage 98, the control of the chosen segment 20 is migrated. The servers 16 update their tables with the proliferated edits or replace their tables with the new table. The servers 16 use the modified/new table that reflects the migration in ownership. The administrator 22 instructs the server 16 that now controls the chosen segment 20 to allow access to the chosen segment 20 thereby di-quiescing the chosen segment 20.

Referring again to FIG. 12, the server 16 is preferably configured to cause new files or directories to be written to the segments 20 in accordance with a non-hierarchical technique or policy. With such techniques/policies, a file or subfolder of a folder will be located/stored in a segment 20 other than the segment 20 storing the folder to which the subfolder or file belongs. Each server 16 can receive write requests from any of the clients 12 that need FIDs to be allocated. The servers 16 are configured to allocate an FID associated with a segment 20 controlled by the server 16 that receives the write request, i.e., a local segment 20 of the server 16. The servers 16 are further configured to determine which server 16 controls a parent directory to which the new file or directory belongs, and to tell the parent-directory-controlling server 16 of the allocated FID and its location. Each server 16 can, in response to receiving notification of a newly allocated FID, store in a parent directory an appropriate pointer and the new file/directory's location on one of the other servers 16.

The servers 16 may be configured to implement other non-hierarchical storage techniques. For example, in a folder/directory, subdirectories can be located hierarchically while files are located non-hierarchically or subdirectories can be located non-hierarchically while files are located hierarchically. Also, the servers 16 may be configured to help improve Inode distribution balance. To do this, each server 16 can consider the current Inode availability metrics (IAMs) of single cylinder groups (i.e., the smallest unit of a file system) associated with the servers 16. The IAM is a weighted average of the percentage of free Inodes and the percentage of free disk blocks. For example, the weighting 75/25 weighs in favor of free Inodes while a weighting of 0/100 weighs entirely in terms of free disk space. The IAM can be used to determine whether to store a new file or directory in a particular cylinder group. For example, in a single-server environment, the servers 16 will allocate an Inode in the same cylinder group as the parent directory for a new file, but for a new directory will allocate an Inode in the segment and cylinder group with the highest inode availability. For new files, however, the servers 16 can allocate an Inode elsewhere if the ratio of the maximum IAM and the IAM of the parent's cylinder group exceeds a threshold.

The servers 16 may implement still other non-hierarchical techniques, e.g., for multiple-server environments. For example, the servers 16 can allocate files to the cylinder group of the parent directory unless a significant IAM imbalance exists. With multiple servers 16, each server 16 has two locations associated with it, the locations being a coordinate pair in a two-dimensional array (e.g., a 100×100 array in x- and y-coordinates). Distances between the locations are the Euclidean distances between the two corresponding coordinate pairs. Distances are measured from the base server 16 that is either the server 16 on which the corresponding parent directory resides or the server 16 that receives a request. Depending upon the distances involved, and the IAM disparities, the servers 16 can determine where to allocate an Inode. For example, the servers 16 could query a jump threshold table, an example of which is provided in Table 1.

TABLE 1

| Switch Factor | Distance |
| --- | --- |
| 150 | 50 |
| 200 | 100 |
| 300 | 200 |

Table 1 represents thresholds (Switch Factor) for IAM Ratios and maximum distance between the base server 16 and the server 16 (e.g., server X) associated with the jump threshold table (i.e., the destination server). The IAM Ratio equals:

$$((\text{IAM of destination server})/(\text{IAM of base server}))\cdot 100.$$

Thus, the servers 16 will allocate Inodes to the base server 16 unless the IAM Ratio is greater than the Switch Factor and the distance from the base server 16 to the destination server 16 is less than or equal to the associated Distance in the jump threshold table. If these latter criteria are met, however, the servers 16 will allocate the Inode to the destination server 16 corresponding to the jump threshold table whose criteria of a row are met. If multiple jump threshold tables are searched, then the Inode is allocated to the server 16 corresponding to the first row of table criteria that are met. Thus, for the first row of Table 1, the Inode will be allocated to the server X if the IAM of server X divided by the IAM of the base server 16, multiplied by 100, exceeds 150 and the distance from the base server 16 to the destination server X is less than or equal to 50.

Another non-hierarchical technique that may be employed by the servers 16 for allocating Inodes to new files uses affinity groups. This affinity-group technique associates one or more of the clients 12 into groups and associates the groups with preferred file system segments for storing files. An affinity group can be one of the clients 12 or a collection of the clients 12. Each affinity group may have a preferred/primary set of segments to which new files are preferably allocated, and a secondary segment set, a tertiary set, etc., in order of priority. Each segment set provides an allocation pool and may have one or more segments in it. Within each segment set, Inode allocation may be based, e.g., on a round-robin technique that may help reduce internal fragmentation (not enough space left in a segment to grow a file that has already been allocated). Segments 20 that are filled beyond an upper threshold can be removed from a segment set and segments 20 that are (or become) filled less than a lower threshold can be added (or re-added) to a segment set.

The administrator 22 can establish, track, and modify affinity groups. The administrator 22 can define the groups and memberships and provide this information to the servers 16, and can track statistics on a per-segment basis for the affinity groups located on the segment 20. In particular, the administrator 22 can track for each segment 20 what percent of capacity is used by each affinity group, and for each group what percent of the group resides on a particular segment 20. The administrator 22 can use the tracked metrics to decide which segments 20 to migrate ownership for, e.g., to help load balancing. For example, if an affinity group is migrated on the client side (i.e., a client 12 accesses a different server 16), the ownership will be migrated for any segment 20 that has a certain level (e.g., at least 50%) of the segment 20 used by the affinity group, and for any segment 20 that contains a threshold level (e.g., at least 50%) of the group's entire usage. The administrator 22 records the statistics, allocation decisions, etc. persistently on segments 20 (e.g., in super-block information or in a special hidden file). Such recording may be synchronous (e.g., on every allocation/removal) or periodic (e.g., every minute). The administrator 22 could alternatively search through segments 20 and compile statistics.

The servers 16 may cause new files to be written to the segments 20 in accordance with other techniques. For example, the servers 16 can store new files in a hierarchical manner. The servers 16 can determine which server 16 controls the directory to which a new file belongs, and ensure that the new file is stored in the segment(s) 20 corresponding to the controlling server 16 (e.g., by forwarding the file to the controlling server 16 for storage, or by obtaining authorization to access the segment(s) 20 associated with the controlling server 16 and storing the file in that segment(s) 20). Another alternative is to spread new files among the servers 16 regardless of the receiving server 16 or the server 16 that owns the directory to which a new file belongs. This spreading may be done, e.g., randomly or following a pre-determined pattern, the selection being from all the file servers 16 or a subset of the file servers 16. The servers 16 may also be configured to employ a combination of any of the above-described techniques and may determine on a case-by-case basis which technique to employ. Various factors may be considered to determine which technique to employ. For example, the hierarchical technique may be used if the directory contains less than a threshold number of files, while the non-hierarchical technique may be used if the threshold is met or exceeded and the receiving server's segments 20 are filled to less than a threshold percentage, and to use the file spreading technique otherwise.

Multiple policies for storing data in the file system may be available to the servers 16. The servers 16 can select which policy to use to store incoming information. The selection may be made once, or may be changed, e.g., over time, or on a per file, per request, and/or per folder basis etc. The available policies may be changed/altered over time by, e.g., adding policies, deleting policies, or modifying existing policies.

Figure 16:
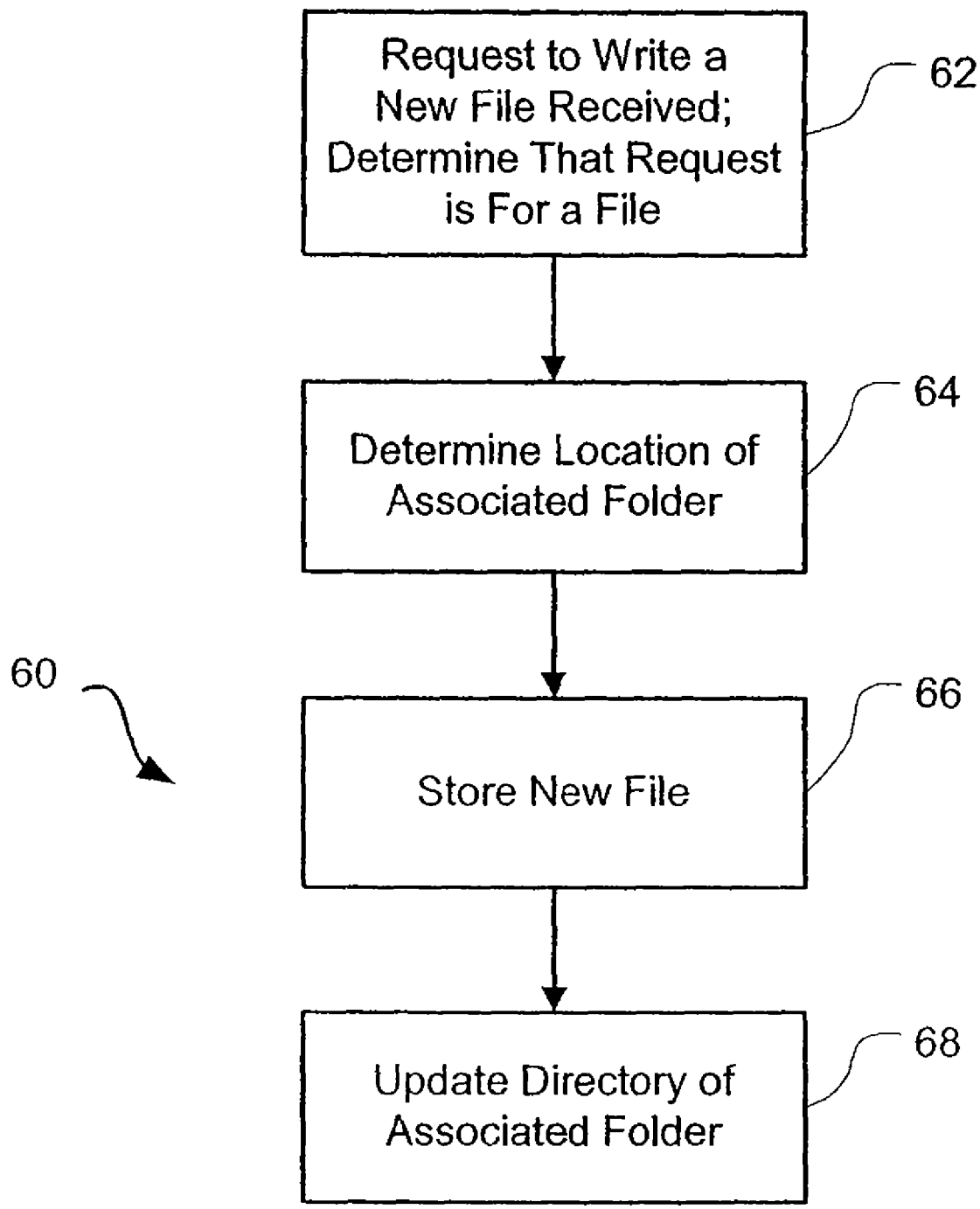
FIG. 16 is a block flow diagram of a process of using a file server to write a new file associated with a folder of another file server using the system shown in FIG. 12.
Figure 17:
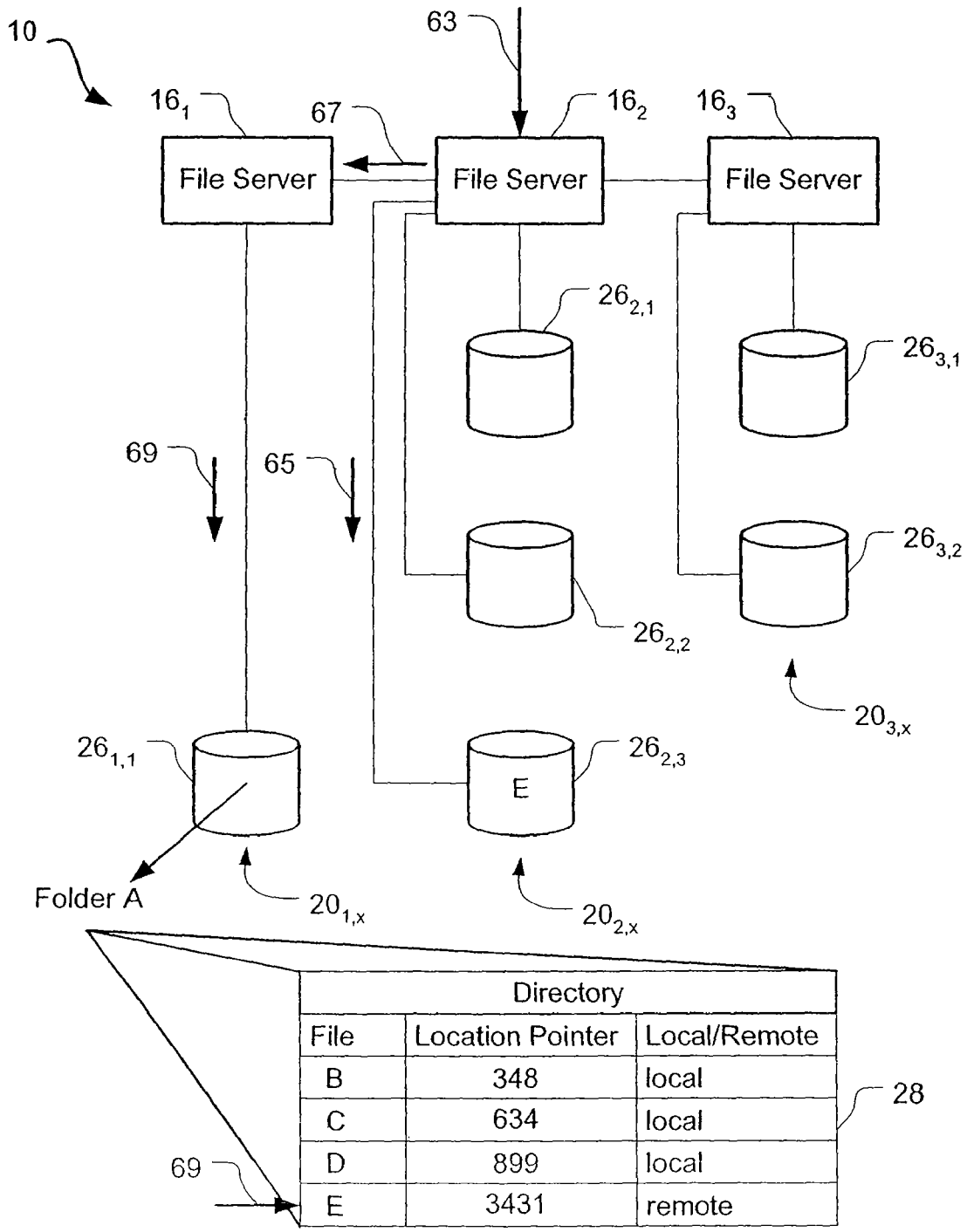
FIG. 17 is a simplified block diagram of communication flow in the system shown in FIG. 12 for an example of the process shown in FIG. 16.

In operation, referring to FIG. 16, with further reference to FIGS. 12 and 17, a process 60 for writing a new file using the system 10 includes the stages shown. The process 60, however, is exemplary only and not limiting. The process 60 can be altered, e.g., by having stages added, removed, or rearranged. For exemplary purposes, it is assumed that a new file is being stored and that the non-hierarchical technique in which the new file is stored on the local, receiving server's segment(s) 20, is employed. For this process, it is assumed that the servers 16 contain storage disks 26 as shown in FIG. 16 for storing the segment(s) 20 associated with the servers 16. It is further assumed that a segment $20_{1,1}$ associated with the server $16_1$ stores a Folder A containing a directory 28 of Files B, C, and D. The directory 28 stores pointers to the files' respective locations and local/remote indicia indicating whether the file is stored on the same segment 20 as the directory 28 or another segment 20. Here, for example, the segments 20 are each associated with 1000 Inode numbers such that $20_{1,1}$ is associated with Inode numbers 1-1000, segments $20_{2,1-3}$ are associated with Inode numbers 1001-4000, and segments $20_{3,1-2}$ are associated with Inode numbers 4001-6000. Further, in this example, files B, C, and D are stored locally in segment $20_{1,1}$ and file E is to be stored in segment $20_{2,3}$.

At stage 62, an incoming request 63 to write a new File E to be associated with the Folder A is received by a server 16, here the server $16_2$. The file server $16_2$ analyzes the request to determine that it is for a new file in the Folder A.

At stage 64, the folder associated with the incoming request is located. The file server $16_2$ determines where the Folder A resides (which server 16 owns/controls the segment 20 that includes Folder A), e.g., by analyzing the Inode number of Folder A using the segment-FID mapping.

At stage 66, the server $16_2$ stores the new File E. The server $16_2$ finds an appropriate location or locations on one or more of its associated segments $20_{2,x}$ to store the new File E. The server $16_2$ sends a communication 65 with the File E to the determined segment 20, here segment $20_{2,3}$ for storage of the File E on the disk $20_{2,3}$.

At stage 68, the directory 28 is updated with a pointer to the location of the stored File E. The server $16_2$ sends a communication 67 with the location of the stored File E to the server $16_1$ that controls the directory 28. The server $16_1$ relays this information in a communication 69 to the directory 28 in the segment $20_{1,1}$. A pointer to the location of the stored File E is stored in association with an indication of the File E in the directory 28. If the File E is stored in more than one location, then multiple pointers may be provided in the directory 28, or only one pointer may be provided in the directory 28, with further a pointer provided, e.g., at the end, of the portion of memory indicated by the pointer in the directory 28.

Alternatively, instead of the server $16_2$ storing the new File E on the associated segment $20_2$, the server $16_2$ could cause another one of the servers 16 to store the new file. For example, the server $16_2$ could send the new File E to the server 16 that owns the corresponding directory, here the server $16_1$. The controlling server 16 could then store the new File E in association with the corresponding directory. The server $16_2$ could alternatively use other techniques to determine which server 16 should store the new file. For example, the server $16_2$ could randomly select one of the servers 16 to store the new file, or could account for one or more factors, such as current or average load on the servers 16 to select a server 16, e.g., the server 16 with the lowest average load, or the greatest amount of free storage space.

Other embodiments are within the scope and spirit of the appended claims. For example, if the process 60 employed the non-hierarchical technique where the IAM Ratio was checked, then jump threshold tables associated with one or more of the servers 16 could be checked. If the IAM Ratio exceeds a Switch Factor and the distance from the base server 16 to the destination server 16 does not exceed the corresponding Distance in a jump threshold table, then the file is stored in association with the destination server 16 associated with the jump threshold table whose criteria are met. Otherwise, the file is stored in association with the base server 16.

Still other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, while Inodes numbers were used frequently above, this was for exemplary purposes and other forms of FIDs (e.g., FCBs, etc.) would be acceptable. Additionally, the description of stage 36 considered the exemplary case where the queried server $16_3$ controlled the desired data. The server $16_3$ may, however, request authorization from another server 16, e.g., the server $16_2$, and this other server $16_2$ or the server $16_3$ may reply to the requesting server $16_1$ with the authorization response. The requesting server $16_1$ can acknowledge and use the authorization from either server 16 and is can be considered as the initially-contacted server $16_3$ providing the authorization response.

What is claimed is:

1. A method of using an administrator device to manage a distributed, segmented single file system implemented by a plurality of file servers that are configured to control metadata of separate segments of the single file system, the single file system including file system entities residing in the segments and comprising at least portions of one of files and directories, the method comprising:

sending a control-migration signal from the administrator to a first file server that controls a particular segment of the file system and to a second file server that is to take control of the particular segment, the control-migration signal indicating to the first file server to stop controlling the particular segment and indicating to the second file server to start controlling the particular segment; and sending an allow-access signal from the administrator to the second file server indicating to the second file server to allow access to a file system entity of the particular segment by the second file server without changing a storage location of the file system entity of the particular segment;

wherein access to the particular segment by the second file server is allowed only after the first file server stops controlling the particular segment.

2. The method of claim 1 wherein the administrator sends the allow-access signal only after control migration of the particular segment caused by the control-migration signal is complete.

3. The method of claim 1 wherein the control-migration signal causes a change in at least one association of file servers and segments in the first and second file servers.

4. The method of claim 3 wherein the change comprises a modification of a mapping of segments and file servers.

5. The method of claim 4 wherein the change comprises one of an editing of the mapping of segments and file servers and a replacing of the mapping of segments and file servers.

6. The method of claim 3 wherein the change occurs in the at least one association in both the first and second file servers at a common first time.

7. The method of claim 6 wherein sending the control-migration signal comprises sending the control-migration signal to each of the file servers implementing the file system, and wherein the control-migration signal causes changes in at least one association of segments and file servers in file servers other than the first and second file servers at a second time, after the first time.

8. A computer program product for use in an administrator device to manage a distributed, segmented single file system implemented by a plurality of file servers that control metadata of separate segments of the single file system, the single file system including file system entities residing in the segments and comprising at least portions of one of files and directories, the computer program product residing on a computer-readable medium and comprising computer-readable instructions for causing a computer to:

send a control-migration signal from the administrator to a first file server that controls a particular segment of the file system and to a second file server that is to take control of the particular segment, the control-migration signal indicating to the first file server to stop controlling the particular segment and indicating to the second file server to start controlling the particular segment; and send an allow-access signal from the administrator to the second file server indicating to the second file server to allow access to a file system entity of the particular segment by the second file server without changing a storage location of the file system entity of the particular segment;

wherein access to the particular segment by the second file server is allowed only after the first file server stops controlling the particular segment.

9. The computer program product of claim 8 wherein the control-migration signal is configured to cause a change in at least one association of file servers and segments in the first and second file servers.

10. The computer program product of claim 9 wherein the change comprises a modification of a mapping of segments and file servers.

11. The computer program product of claim 10 wherein the change comprises one of an editing of the mapping of segments and file servers and a replacing of the mapping of segments and file servers.

12. The computer program product of claim 9 wherein the control-migration signal is configured to cause the change to occur in the at least one association in both the first and second file servers at a common first time.

13. The computer program product of claim 12 wherein the instructions are configured to cause the computer to send the control-migration signal to each of the file servers implementing the file system, and wherein the control-migration signal is configured to cause changes in at least one association of segments and file-servers in file servers other than the first and second file servers at a second time, after the first time.

14. A method of processing a segment access request in a distributed, segmented single file system implemented by a plurality of file servers that are configured to control metadata of separate segments of the single file system, the single file system including file system entities residing in the segments and comprising at least portions of one of files and directories, the method comprising:

transmitting a segment access request, from a requesting device to a selected file server of the plurality of file servers, requesting access to a particular segment of the single file system controlled by the selected file server;

receiving the segment access request at the selected file server from the requesting device, the single file system including a root directory and being organized such that any file or directory of the single file system can be accessed by traversing the single file system starting from the root directory, the segment request corresponding to a first association of file system segments and the plurality of file servers stored by the requesting server, the selected file server storing a second association of file system segments and the plurality of file servers; and rejecting the file segment access request at the selected file server, without indicating which file server controls the particular segment, if the first and second associations differ with respect to which file server controls the particular segment; and accessing the file system entity, if the segment access request is granted, without changing a storage location of the file system entity of the particular segment.

15. The method of claim 14 further comprising:

if the second association is older than the first association, then:
obtaining a first updated association of file system segments and the plurality of file servers by the selected file server; and
processing the request by the selected file server in accordance with the first updated association; and if the second association is newer than the first association, then:
obtaining a second updated association of file system segments and the plurality of file servers by the requesting server; and processing transmitting the request by the requesting device in accordance with the second updated association.

16. The computer program product of claim 8 wherein the instructions are configured to cause the administrator to send the allow-access signal only after control migration of the particular segment caused by the control-migration signal is complete.

* * * * *

UNITED STATES PATENT AND TRADEMARK OFFICE
CERTIFICATE OF CORRECTION

| | | |
|---|---|---|
| PATENT NO. | : 7,769,711 B2 | Page 1 of 1 |
| APPLICATION NO. | : 11/755649 | |
| DATED | : August 3, 2010 | |
| INVENTOR(S) | : Sudhir Srinivasan et al. | |

It is certified that error appears in the above-identified patent and that said Letters Patent is hereby corrected as shown below:

In column 31, line 14, in Claim 13, delete "file-servers" and insert -- file servers --, therefor.

In column 31, line 26, in Claim 14, after "to" insert -- a file system entity of --.

In column 32, line 3, in Claim 14, after "servers;" delete "and".

In column 32, line 4, in Claim 14, after "the" delete "file".

In column 32, line 25, in Claim 15, before "transmitting" delete "processing".

Signed and Sealed this
Third Day of May, 2011

David J. Kappos
*Director of the United States Patent and Trademark Office*